June 13, 1967
D. C. McLEAN
3,324,663
ROCK BOLTING
Filed Oct. 21, 1963
5 Sheets-Sheet 1
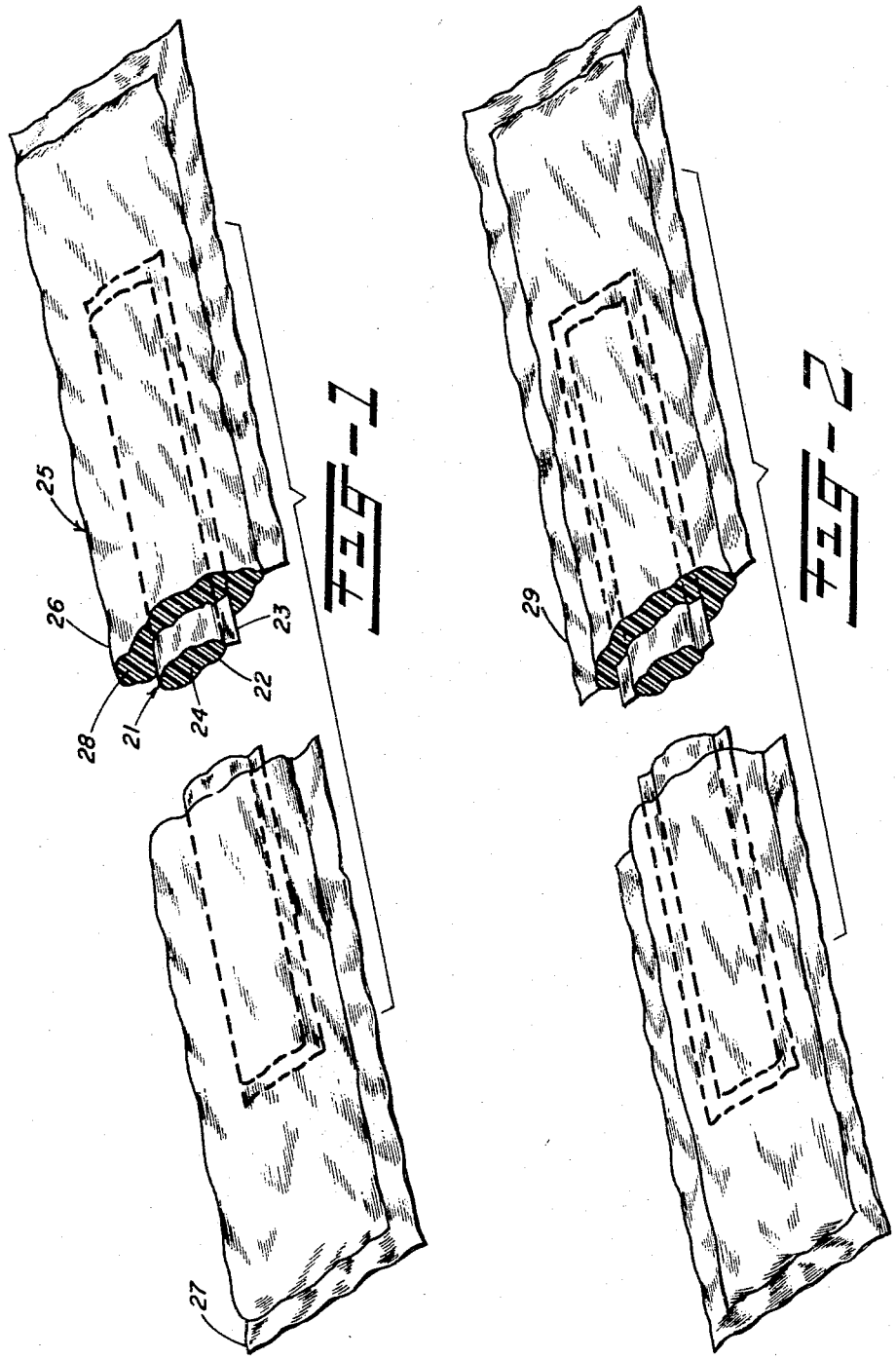
INVENTOR.
DANIEL CHALMERS McLEAN
BY
ATTORNEY

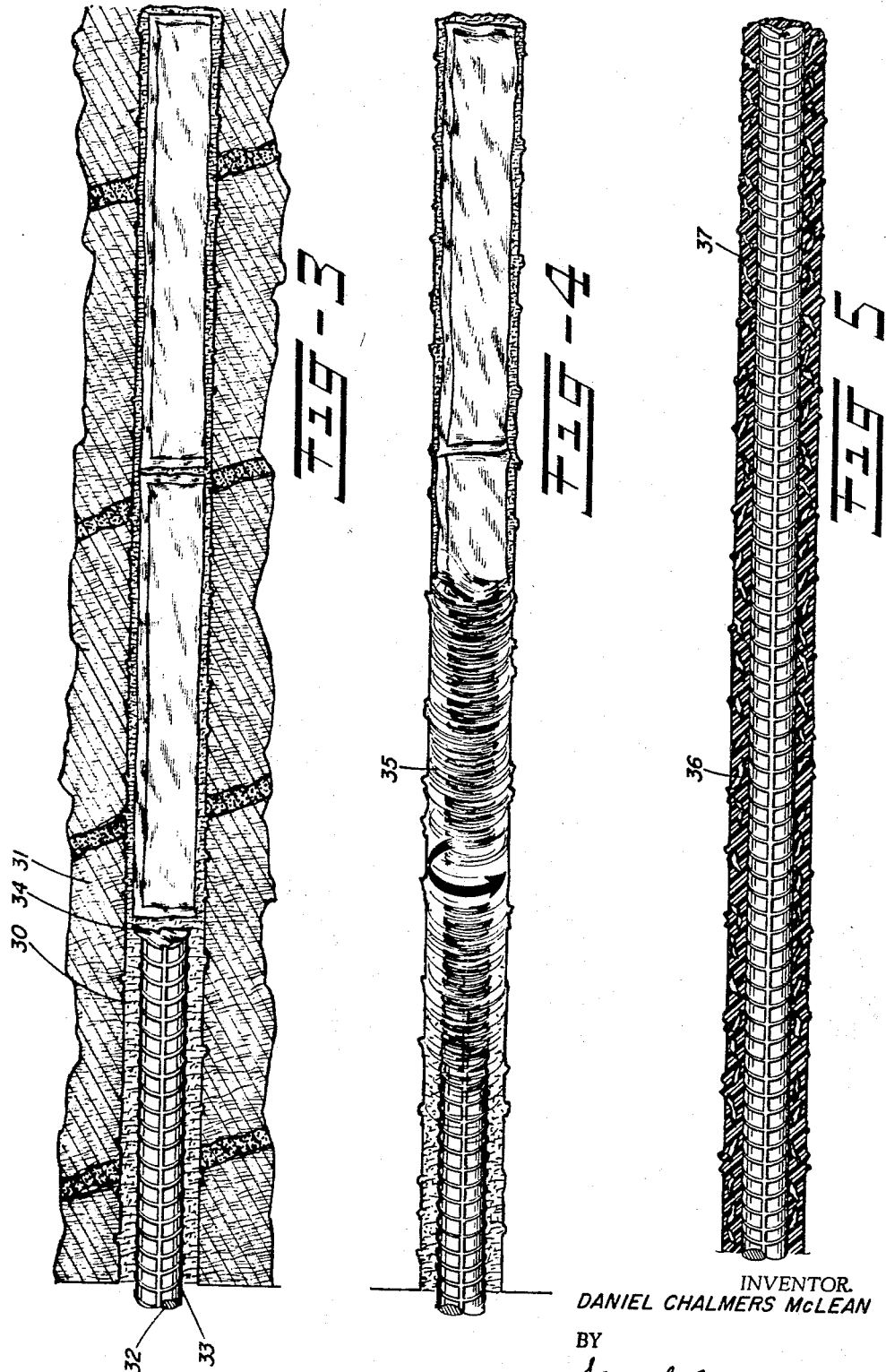

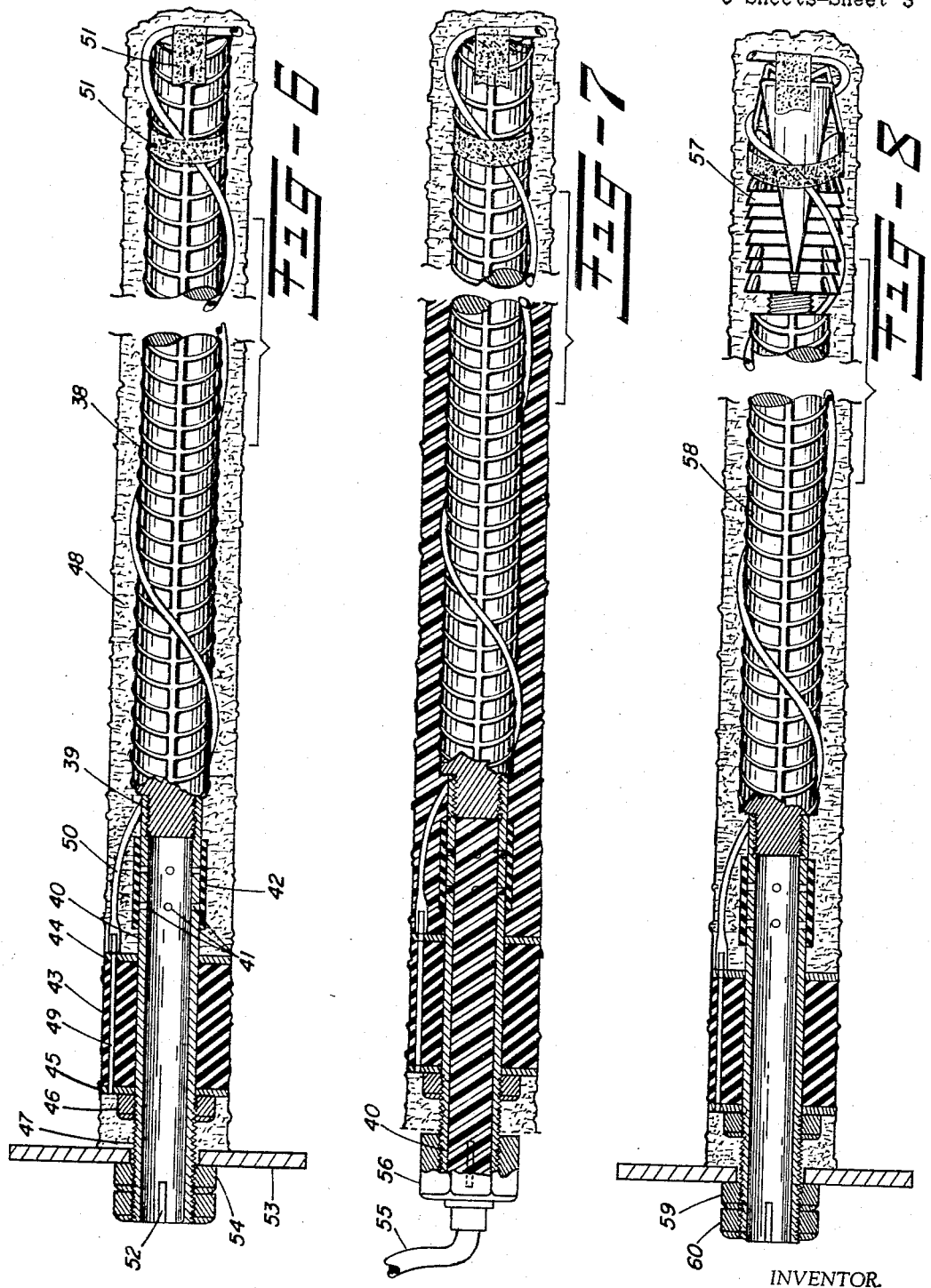

June 13, 1967 D. C. McLEAN 3,324,663
ROCK BOLTING
Filed Oct. 21, 1963 5 Sheets-Sheet 4
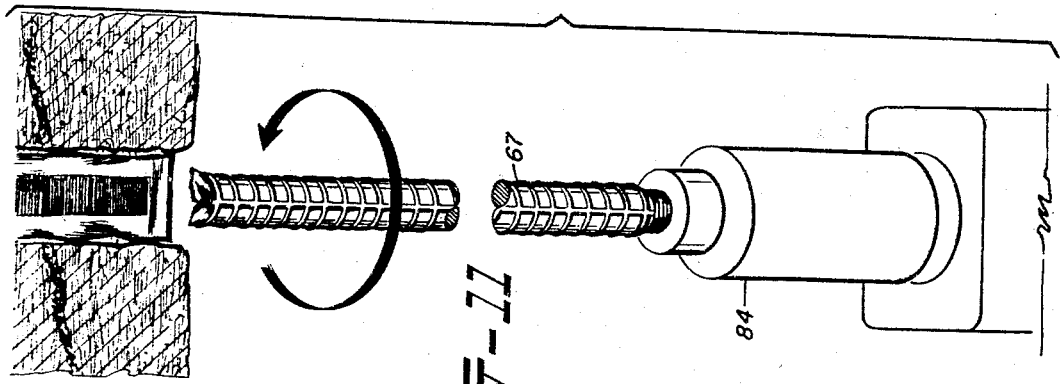
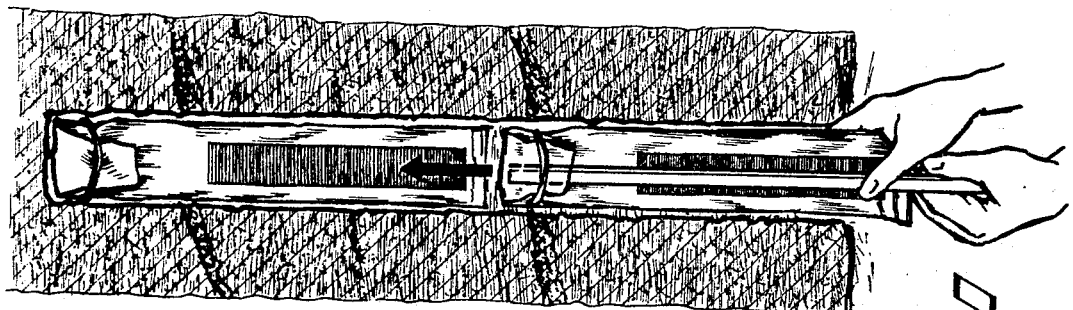
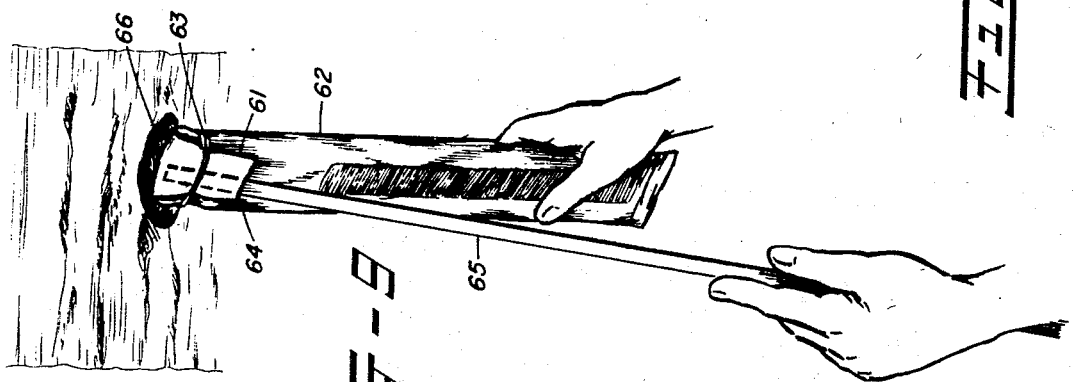
INVENTOR.
DANIEL CHALMERS McLEAN
BY
Samuel Branch Walker
ATTORNEY

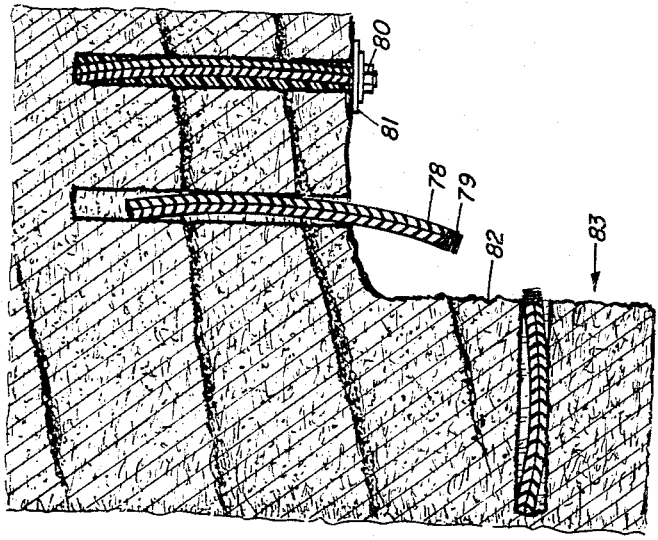
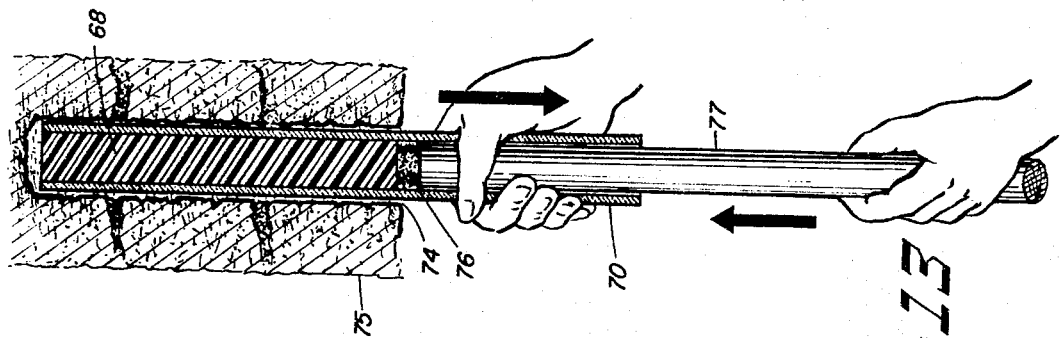
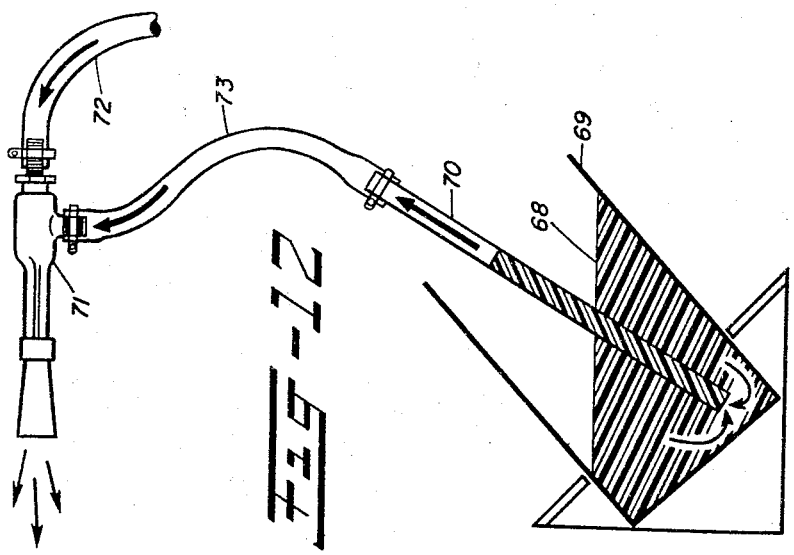
INVENTOR.
DANIEL CHALMERS McLEAN

United States Patent Office 3,324,663
Patented June 13, 1967

3,324,663
ROCK BOLTING
Daniel Chalmers McLean, Stamford, Conn., assignor to American Cyanamid Company, New York, N.Y., a corporation of Maine
Filed Oct. 21, 1963, Ser. No. 317,563
13 Claims. (Cl. 61—36)

This invention relates to a method of stabilizing rock formations, including mine roofs as in coal mines, and reinforcing rock formations, for example, vertical walls in mining, military or other engineering structures, by injecting a storage-stable, mine-temperature curing, thermosetting thixotropic polyester resin into the rock formation, with or without additional reinforcements such as rock bolts, reinforcing bars, Fiberglas bars, or perforated tubes; and to a storage-stable thixotropic resin system which has particular use in stabilizing of rock formations.

A copending continuation-in-part application, Ser. No. 498,584, Oct. 20, 1965, has issued as Patent 3,302,410, Feb 7, 1967.

For convenience in describing and claiming, the invention may be indexed:

(I) A storage-stable, two-component resin composition having a water-reactive filler, preferably Portland cement with one component and water with the other, which on mixing forms a minimum-shrinking, mine-temperature curing thixotropic polyester resin, independent of use.

(II(a)) A "sausage" package having the above composition in separate compartments for mixing.

(II(b)) The method of inserting such "sausage" packages in a rock bolt hole and mixing the composition by agitation with the rock bolt in the hole, the bolt to include reinforcing bars of metal or Fiberglas.

(III) The method of externally mixing the resin and vacuum filling a transfer tube by:
  (a) External vacuum, or
  (b) A piston within the transfer tube, transferring the resin into the bolt hole, filling from the far end of the bolt hole, and then inserting a reinforcing rod of Fiberglas or metal, preferably bent so as to be self-retaining.

(IV) The method of pre-mixing the resin and injecting through a bolt having a short pipe segment with a packing adjacent the rock face screwed on to a longer length of the bolt, including:
  (a) Retaining the bolt by the packing alone;
  (b) Retaining the bolt by an expansion wedge on the far end of the bolt, each with
  (c) An air bleed tube for any formation,
  (d) No bleed tube for porous formations,
  (e) The roof bolt itself, or
  (f) The thus reinforced rock formation.

(V) In any and all of the above, resin is forced into the rock formation depending on
  (a) The pressure on introduction of the resin, and
  (b) The porosity of the rock formation.

In mine work, such as coal mining, or in underground formations such as in drilling tunnels, or in excavations; faults and flaws in the rock structure cause zones of weakness, or the rock structure inherently is weaker than required, or has been or may be weakened by shock action, such as explosives, nuclear or conventional. Such rock formations may be strengthened by the injection of a thermosetting resin system which hardens to give added strength. At times an additional strengthening member such as a rock bolt, or section of reinforcing rod of the type normally used for reinforcing concrete, or a metal tube, which may be perforated or Fiberglas rod is utilized to raise the strength to a desired minimum value. The reinforcing metal can be used for reducing the rate of chipping in ore passages in which the ore slides down an unprotected rock chute and dislodges fragments, unless the rock is reinforced.

(I) The use of polyester resins in underground formations is disclosed in United States Patent 3,091,935, Brown and Prichard, "Rock Treatment," June 4, 1963, and certain particularly useful compositions are disclosed in United States Patent 3,091,936, Lundberg, Schlegel and Carpenter, "Resinous Composition," June 4, 1963. The use of up to 5% plaster of Paris or Portland cement as a water-absorbing and binding compound in polyester resins is disclosed in United States Patent 2,288,321, Nordlander and Hurst, "Moldable Composition and Molded Article and Method of Making the Same," June 30, 1942.

Resins which are thixotropic are described in such patents as a series to Nordlander and Loritsch, together, individually, or with others, including 2,610,958, 2,610,-959, 2,610,960, 2,610,961, 2,631,137, 2,641,586, and 2,641,587, which disclose fillers such as certain clays, preferably in the presence of moisture, silica, talc, vermiculite, silica aerogel, and some of which may have non-ionic surface active wetting agents present.

Other patents on thixotropic resins include United States Patents 2,857,359, Schollick and Downing, "Process For Preparing Thixotropic Polyester Resin Composition and Product Obtained Thereby," Oct. 21, 1958, and 2,887,461, Hort, "Thixotropic Resin Composition Comprising an Unsaturated Alkyd Resin, Styrene and Silica Aerogel," May 19, 1959.

A number of polyester resins are well known in the prior art, being disclosed in such patents as 2,443,736, Kropa, "Copolymer of Dialkyl Phthalate and Unsaturated Alkyd Resin," June 22, 1948, and the references cited therein. British Patent 805,574 discloses the use of glass fibers, asbestos, cellulose fibers, and other organic and inorganic fibers as a filler for polyester resins and includes a disclosure on Portland cement and water in a heat-hardening polyester resin composition. Other polyester compositions used as coatings for Portland cement are disclosed in such patents as United States Patent 3,089,784, Dowling, "Polyester Coating System," May 14, 1963.

The term "thixotropic" refers to the characteristic of a fluid material having a non-Newtonian viscosity, whose viscosity increases as the shear rate decreases so that when stirred the material has a comparatively low viscosity and when stirring is ceased has a higher viscosity. The related phenomena of gelling is an increase of viscosity on standing without agitation, not necessarily reversible. The resins of this invention are thixotropic but may also have a fast gelling action which also causes them to remain in place temporarily, as well as a slower gelling action which is a prelude to and part of curing of the resin.

(II(a)). The use of double compartment packages for polyester resins, among others, is disclosed in United States Patent 3,087,606, Bollmeier and Vokaty, "Package of Inter-Reactive Materials," Apr. 30, 1963. This patent discloses the use of a dye or pigment to permit visual inspection of the thoroughness of mixing and discloses inner containers to be ruptured within an outer container so that on agitation a fast-setting resin composition is formed.

(II(b)). The introduction of resins into rock holes, but limited to the end adjacent an expansion fitting, is disclosed in such patents as 2,829,502, Dempsey, "Mine Roof Bolt Installation," Apr. 8, 1958.

(III) Certain methods of transferring resinous compositions into rock holes are disclosed in applications of Thomas W. Kierans.

(IV) The use of bleed tubes to permit air to escape as concrete compositions are introduced into a rock hole followed by a reinforcing bar but filling from the lower-most part of an overhead hole, that is from the face up, and venting at the upper end is disclosed in United States Patent 2,930,199, Jarund, "Method of Anchoring Bolts," Mar. 29, 1960. With this method, care must be used to avoid squeezing the bleed tube, and the drill hole must be perfectly straight.

Filling of an apertured sleeve with concrete, inserting the sleeve in a rock bolt hole, and then ejecting concrete through the apertures in the sleeve is disclosed in United States Patent 2,849,866, Flygare, "Roof-Bolting," Sept. 2, 1958. Hollow bolts through which quick-setting cements or other fillers are injected for reinforcing underground structures are disclosed in United States Patent 2,667,037, Thomas and Barry, "Suspension Roof Support," Jan. 26, 1954.

The above and other patents disclose polyester compositions which set at room temperature *or* set in the presence of water *or* are storage stable as mixable components. The three sets of characteristics have been regarded as mutually exclusive.

By this invention there has been discovered, made, and is here disclosed, a polyester resin system which is (a) storage stable in readily mixable component form, which components may be stored for at least one month at 80° F. and in the preferred embodiments may be stored for more than a year, *and* (b) which components when mixed form a resin which hardens in a few hours at room temperature and common mine temperatures, *and* (c) sets in the presence of water and adheres to wet surfaces, *and* (d) is sufficiently thixotropic to permit placement in overhead holes in a mine as, for instance, exemplified by the characteristic of remaining in place in an overhead vertical 1½" drilled hole in rock when the composition is transferred from a transfer tube into the hole in the rock starting at the end farthest from the working face so that the resin may be filled in place and left to cure without problems of flowing out of the hole in the rock, even though the hole is straight up. Also, the resin while flowing thins enough so that part of the resin flows into fissures and faults in the rock structure, adhesively uniting the rock elements, further strengthening the formation.

By this invention, and as part thereof, polyester resin formulations are described which may be stored as two or more components and as the separate components can be stored in either tin cans or plastic envelopes and which are stable on storing for at least six months under storage conditions apt to be encountered in mining areas, which includes temperatures from at least 0° F. and perhaps —40° F. to temperatures as high as 120° F.

As introduced into holes in the rock the resin of the preferred embodiment is sufficiently thixotropic that it will retain itself in bolt holes having at least a 1½" diameter drilled in any direction which requires a viscosity at low shear rate of at least from 20,000 to 100,000 centipoises and upward.

The formulations below give very good results from the standpoint of viscosity, shelf life, stability, container corrosion, separation of the phases, and flow characteristics, both in storage and in use. When mixed and injected these resins are thixotropic, permitting overhead injection, set up rapidly at temperatures encountered in mines, that is at least from about 40° F. to 90° F. and preferably from about 32° F. to 100° F., with minor adjustments in the promoter ratios being used to give preferred setting times for the conditions anticipated and on curing have a low exotherm and a low shrinkage. The presence of water contributes towards a low exotherm. As used in this disclosure, the term "mine temperature" refers to the range of 40° F. to 90° F., the range of common temperatures in mining operations.

Technically the present resins do not completely cure in the sense that polymerization is completed, but cure to 80–90% of theoretically complete polymerization and, hence, the resin may be somewhat weaker than would result from a complete cure but the minor incompleteness in the cure markedly reduces shrinkage and appears to contribute towards a low exotherm, and still gives both sufficient adhesion to cause rock strata to adhere to each other and to bond a bolt or reinforcing bar, usually of steel, into a drilled hole in rock sufficiently firmly that the steel will fail before the resin bond fails. Insofar as adhesion of the reinforcement to the rock is concerned, there is little advantage to be gained from stronger resins once the point has been reached at which the steel reinforcing members fail.

The high water content of the resin gives a relatively lower electrical resistance which permits usage as an electrical resistance heating element.

The invention is described in conjunction with drawings exhibiting certain aspects thereof:

FIGURE 1 is a pictorial view, in partial section, of a long two-compartment resin package made from folded sheets sealed on the sides.

FIGURE 2 is a pictorial view, in partial section, of a long two-compartment resin package from two separate sheets sealed on all sides.

FIGURE 3 is a sectional view of two "sausage" packages inserted in a hole in rock before inserting a reinforcing rod.

FIGURE 4 is a sectional view, as in FIGURE 3, showing the rod being rotated to break the packages and mix the contents.

FIGURE 5 is a sectional view, as in FIGURE 3, showing the rod completely inserted, the resin mixed, with package fragments interspersed.

FIGURE 6 is a sectional view of a pipe section screwed to a reinforcing rod in a bolt hole, before injection of resin.

FIGURE 7 is a sectional view, as in FIGURE 6, as the resin is injected.

FIGURE 8 is a sectional view of modification using a reinforcing rod with an expansion wedge to hold the bolt in position.

FIGURE 9 is a view of a modification of the sausage resin package, including an insertion pocket, and a method of its introduction.

FIGURE 10 is a sectional view after the insertion of one package, as in FIGURE 9, as a second is being introduced.

FIGURE 11 is a partial sectional view showing the mechanical rotation of the reinforcing bar, as it is being introduced.

FIGURE 12 is a partial sectional diagrammatic view of filling a resin transfer tube by vacuum.

FIGURE 13 is a view, in partial section, of a resin transfer tube being used to fill a roof bolt hole.

FIGURE 14 shows reinforcing members in place in an underground structure.

As shown in FIGURE 1, a preferred embodiment of the present invention is a dual-compartment package relatively long and slender. As shown in FIGURE 1, this package consists of an inner compartment 21 composed of an inner sheet 22 which conveniently may be of a laminate such as a polyester film laminated to a polyethylene or polypropylene film. The laminated sheet is folded around and peripherally united with a seal 23, which gives an air-tight seal to protect the inner compartment contents 24 from interaction with materials external thereto.

The inner compartment is sealed in an outer compartment 25 formed from an outer sheet 26 peripherally united with an outer seal 27. The outer compartment resin component 28 is packaged between the inner and outer sheets. By having the outer sheet of a material such as the polyester, polyethylene, or polypropylene laminate, the outer compartment resin component is protected from contact with the air, and hence oxidation and evaporation.

The contents of the two compartments will be described later in connection with specific examples and conveniently the resin component having the greater volume is in the outer compartment and the resin component having the smaller volume is in the inner compartment. The relative volume of the two compartments is obviously a matter of choice and can be adjusted for any volume ratio and, factually, the component having the larger volume can be sealed in the inner compartment without difficulty but packaging materials can be saved if the inner compartment has the component with the smallest volume.

The ratio of length to diameter can vary depending upon the designed usage. For rock bolt sealing, in which the unbroken package is placed in the rock bolt hole, the cross section of the outer compartment must be such that the package is insertible in the bolt hole. Although not limited thereto, rock bolt holes are most commonly drilled in the diameter of not less than 1″ and usually not greater than 1½″. The finished package should have a cross section at least about ⅟₁₆″ or more less than the minimum diameter of the rock bolt hole for convenience of insertion. In order to have an adequate volume the packages are conveniently from around 8″ to 34″ in length. When the length is less than 8″ the volume is apt to be uneconomically small and where the length is too great the package can be awkward to handle. Because of the general appearance of the package, it is inevitable that the name "sausage package" or just "sausage" or "resin sausages" be attached.

FIGURE 2 shows a similar package except that the compartments are formed from separate sheets having a peripheral seal 29 extending completely around on all sides of the package without folds.

In use in rock bolting one or more resin packages, such as shown in FIGURES 1 or 2, are inserted into a hole 30 drilled in rock 31, as shown in FIGURE 3. The packages may be pushed into the hole in the rock using a tamping stick, usually available in underground workings for tamping explosives into drill holes. The holes in the rock are conveniently drilled with the same equipment as is used for drilling holes for explosive charges. A reinforcing rod 32 is inserted in the hole. Conveniently the reinforcing rod is of steel with serrations 33 thereon. The rod used for reinforcing concrete is usually preferred because such concrete reinforcing rods are readily available from large inventories and the cost of special steel mill rolls is avoided. Other forms of serrations and other roughness on the rods, including threads, give good results but the economic advantages of being able to use conveniently commercially obtainable components is a governing consideration dictating the use of concrete reinforcing rods.

The end of the rod first inserted in the hole is deliberately roughened to form a tearing face 34. The rod is forced into the hole and compresses the resin sausages towards the bottom of the hole and the rod is rotated, which tears both the inner and the outer sheets forming the resin compartments and mixes together the two components in the two compartments to form an essentially homogeneous curable resin mixture 35. Fragments 36 of the sheet material remain in the resin mixture but are small enough and sufficiently well interspersed that the resin cures to form a hardened resin 37, as shown in FIGURE 5, which firmly holds the reinforcing rod in position and at least in part penetrates out into the rock 31, adhesively uniting fissures in the rock by gluing the masses of rock to each other. The resin conveniently, but not necessarily, is proportioned in volume so as to substantially fill the cross section of the hole not occupied by the reinforcing rod for nearly its entire length. Small portions of the resin may be lost during the rotating and mixing and usually a few inches of unfilled space near the inside face is acceptable. The exact proportions can be varied depending upon the particular working conditions and the reason and need for strengthening the rock by adhesively uniting and introducing portions thereof and adhesively uniting the rock to the reinforcing rod.

In FIGURE 6 a length of reinforcing rod 38 has rod threads 39 at the end closest to the working face and on the threads is engaged a short piece of pipe 40. Conveniently, but not necessarily, the male threads are on the reinforcing rod and either pipe threads or machine threads are suitable. In the pipe near the reinforcing rod are injection vents 41. Whereas one vent is sufficient, more permit a faster injection of resin. Annularly surrounding the pipe and covering the injection vents is a resilient sleeve 42, of rubber or other resilient tubing, which in the unstressed state has an internal diameter slightly smaller than the external diameter of the pipe and thus is at least slightly stretched over the injection vents. In use, the resin in liquid condition readily flows through the vents, further stretches the resilient sleeve and flows outside of the pipe. The resin cannot flow back as the sleeve seals the injection vents. The resilient sleeve thus acts as an inexpensive one-way valve.

Also externally of the pipe and closer to the working face is a resilient seal 43, conveniently of a soft rubber or plastic material, which is retained on the pipe between a fixed washer 44 and a movable washer 45. The movable washer is moved by a packing nut 46 which engages machine threads 47 on the external end of the pipe. When the reinforcing member is installed in the drill hole 48 the packing nut 46 is tightened against the movable washer 45, which expands the resilient seal as it is compressed between the fixed washer 44 and the movable washer 45, expanding the resilient seal against the drill hole walls, thus both positioning the pipe and hence the reinforcing rod and sealing the pipe into the drill hole with a liquid-tight seal.

Through the resilient seal and beyond the fixed washer and the movable washer is a small vent pipe 49 to the inner end of which is attached a flexible vent tube 50. The flexible vent tube extends to the inner end of the reinforcing rod 38 and is attached thereto with an adhesive tape 51, or other fastener. Conveniently the flexible vent tube is spiraled about the reinforcing rod so that it may be more easily inserted in the drill hole. The end of the flexible vent tube is positioned so that it will bleed air from the upper most point of the drill hole to permit air to escape as the resin composition is injected. With impervious formations the vent tube is essential for holes extending upwardly. With fissured or pervious formations trapped air can be displaced into the rock formation and hence a vent tube to bleed air is optional. In many underground operations the vent tube should be included as a matter of course because of the uncertainty as to whether there is a fissure in the formation near the end of the drill hole to premit air to escape and it is easier to include the vent tube than to check each individual hole for porosity. The end of the pipe exposed at the mineral face has a slot 52 therein in which a screw driver or other tool can be placed to hold the pipe and rod against rotation while nuts are being tightened thereon. Sometimes the reinforcing rods are used primarily to reinforce the deeper lying portions of the formation and an exposed end or nut would obstruct the working face as, for example, where the bolts are used in ore passages where the ore is sliding along adjacent to the mineral face. In coal mines or other places where the rock surface at the face is to be retained, as for example in roof bolting itself, a retaining plate 53 is placed over the end of the pipe and held against the formation face by a retaining nut 54. The retaining nut is tightened finger tight or slightly more during placement of the rod as the resilent seal only is holding the rod in position but after the resin is injected and solidified the retaining nut 54 can be tightened firmly against the retaining plate. The limiting factor on tightening is usually the stress required to cause failure of the threaded junction between the pipe 40 and the reinforcing rod 38. The cutting of the threads weakens both the pipe and the rod, as is common with threaded fastenings. A welded joint can also be used and a good weld can show a joint efficiency approaching 100%. Conveniently, the piece of pipe 40 is of a high strength alloy and welding would either draw the temper or require manufacturing procedures that would run up the cost.

The cost factors involved as well as corrosion factors in underground work or buried work as well as the length of time over which strength is required are such that generalization is unwarranted and different mining or rock reinforcing problems are most advantageously solved by slight modifications in structure. For a great deal of mining work a particular passage will not be in use long enough to warrant the use of corrosion resistant or stainless metals. Where the rock bolting is used to reinforce bridge abutments, bridge anchorages, dams, missile sites, or other engineering structures, for which a long life is desired, alloys resistant to particular environmental conditions are selected.

After the placement in the drill hole a resin supply line 55 is attached to the exposed end of the pipe 40 with a coupling nut 56. Conventional couplings can be used, the coupling nut 56 being long enough to cover the slot 52 and the pre-mixed resin immediately after mixing and before appreciable polymerization has occurred is injected through the resin supply line into the pipe through the injection vents 41 and into the drill hole. Air is permitted to escape either into the formation or through the vent tube 50. Preferably and usually the entire drill hole is filled with the resin, which is permitted to harden. Examples of resins which harden under ambient temperature conditions are described later. Obviously because the resin is held in place with the resilient seal 43 a thinner and more flowable resin may be used than in the preceding modification in which the resin is retained in position by only its own stiffness.

The thickener and water may be omitted for use with this injection bolt. The catalyst and promoter are necessarily stored separately. By using a liquid formulation for the component containing each of the catalyst and promoter, the two can be separately pumped at a volumetric rate so as to mix in a desired ratio, and if separately fed into the injection bolt, pot life problems are eliminated because the mixing occurs in the bolt itself. Hence a very fast curing resin can be used, and advantageously rapid strength is obtained. With this bolt, other systems such as spray systems give good results where the components are separately injected into the bolt, and the injection vents 41 and resilient sleeve 42 accomplish a good mixing action so that a homogeneous mixture is achieved.

In the modification shown in FIGURE 7, a retaining plate 53 such as shown in FIGURE 6, has not yet been emplaced and for some types of reinforcement the face plate may not be needed but where needed the face plate may be placed on the emergent end of the pipe before or after resin filling and a retaining nut 54 used to draw the retaining plate against the working face of the mineral formation.

The resin shown in FIGURE 7 is in the process of being injected and hence has not yet completely filled the drill hole.

A modification is shown in FIGURE 8 in which an expansion wedge 57 is placed on the front end of the reinforcing rod. The expansion wedge can be expanded in accordance with usual procedures and gives an immediate strength and support to the reinforcing rod 58. This modification is preferred for underground situations which call for immediate support which can be given by the expansion wedge and the reinforcing rod which immediately acts in the same fashion as the older types of conventional rock bolts and the unhardened resin is pumped into the drill hole to surround the entire bolt, which resin on hardening gives additional reinforcement in its own right along the entire length of the reinforcing rod and also encases the expansion coupling and protects the adjacent mineral formation from the effects of air and thus lengthens the useful life of the expansion fitting itself. The details of the expansion fitting are conventional and are not part of the present invention.

As show in FIGURE 8, both a retaining nut 59 and a lock nut 60 are used, with the lock nut serving in the dual capacity of locking the retaining nut against rotation from vibration and serving to protect the threads on the end of the pipe for the subsequent attachment of a coupling nut for resin injection.

FIGURE 9 shows a modification in which the package end 61 of the resin package 62 is folded over and held against the package with a tie string 63 to form a pocket 64. A slender insertion rod 65 fits into the pocket so that the resin package 62 is pulled into the drill hole 66. For rough drill holes, particularly with long resin packages, the pulling by means of the insertion rod acting from the front end aids in preventing the package from jamming in the drill hole. The effect may be likened to a piece of rope where a long piece of rope can be pulled but only a short piece of rope can be pushed. Where the slenderness ratio, that is the length to diameter, is more than about 10 to 1 with laminated packaging materials, the resin package or sausage may jam on insertion but packages of much greater slenderness ratio may be inserted with an insertion rod 65, the limiting factor being the stiffness of the rod.

FIGURE 10 shows the insertion of two pocketed resin packages into a drill hole in rock; this view being in cross section of the same insertion procedure as shown in FIGURE 9. After the drill hole is filled with the packages the reinforcing rod 67 is inserted and rotated. Diagrammatically, an impact wrench 84 is shown as equipment normally present in a mine which may be used for rotating the reinforcing rod as it is inserted. The rotation breaks open both compartments and shreds the laminated sheets and insures thorough mixing of the resin to a homogeneous hardenable mixture which will uniformly and solidly bond the reinforcing rod to rock surfaces of the drill hole and also cause the extrusion of resin into zones of weakness or fissures in the rock formation, giving the additional adhesive bonding of the rock to rock, as described in the Lundberg patent, 3,091,936, supra.

FIGURES 12, 13 and 14 show an alternative method of introduction of the resin into the drill hole in rock.

As shown in FIGURE 12, the two components of the resin from storage containers which may be either the sausages above described, or separate containers, such as tin cans, are mixed together to form a hardening resin 68, in a container 69. Conveniently the container may be the shipping container for the more bulky component. The pot life of the hardening resin is limited, depending upon composition and temperature. A pot life of from about 5 minutes to 2 hours allows adequate working time depending upon the speed of the operating crew. A portion of the hardened resin is drawn into a transfer tube 70. The transfer tube may be a cardboard tube or metal tube or plastic tube. An adherence-resistant tube such as a polyethylene or polypropylene or polytetrafluoroethylene or polychlorofluoroethylene is preferred as the resin does not bond to such materials and hence even though the tube may become covered both internally and externally with the resin, the resin can be permitted to harden and thus become brittle enough so that by flexing the transfer tube or hitting it against a solid object, the resin can be caused to break loose and fall clear of the transfer tube. The transfer tube is filled with the hardening resin 68 by drawing the resin up into the tube. An ejector 71, operated by a compressed air line 72, may be used to apply suction through a suction tube 73 causing filling of the transfer tube. A tight fitting piston in the transfer tube can also be used to fill the transfer tube.

After filling, the transfer tube is inserted into the drill hole 74 in a rock formation 75, so that the transfer tube is adjacent to the bottom end of the drill hole. A resilient piston 76, which may conveniently be of cork or felt, is pressed by a ramming rod 77 into the transfer tube forcing the hardening resin 68 out of the transfer tube into the bottom of the drill hole. The transfer tube is withdrawn as the ramming rod 77 is inserted at such a rate that the entire cross section of the drill hole is filled with the hardening resin. Depending upon the pressures used, and the size of fissures in the rock formation 75, a hardening resin is forced into the fissures. After substantially all of the hardening resin has been extruded from the transfer tube into the drill hole the transfer tube is removed, preferably leaving the resilient piston in the transfer tube. Into the resin-containing rock hole is then inserted the reinforcing rod 78. The reinforcing rod as it is inserted displaces part of the resin. Preferably the inserted volume of resin is chosen with respect to the drill hole and reinforcing rod such that as the reinforcing rod bottoms in the drill hole the resin substantially fills the entire space between the drill hole and the reinforcing rod. As later described, the resin is preferably thick enough so that it will retain itself because of its high viscosity and thixotropy in the drill hole. This reinforcing rod is preferably either pre-bent or after it is shoved part way into the hole bent by the operator so that it has enough of a bow that the friction of the rod against the sides of the drill hole will retain the reinforcing rod in position.

As shown in FIGURE 14, the reinforcing rod has threads 79 at the emergent end on which a nut 80 and retaining plate 81 are placed. Not all reinforcing rods require a retaining plate. Such plate is commonly used so that the reinforcing rod holds a larger section of the exposed rock face 82 in position. Where used to reinforce internally a rock formation, the bonding all along the reinforcing rod is effective in strengthening and to the extent that the characteristics of the mineral formation are known, conventional stress analysis techniques are useful. Where the reinforcing rod is used to support the working face or as a support for suspended structures in a mine tunnel 83, or for various items in engineering structures in general, the load-bearing characteristics of the resin bonded rod are of importance and in at least representative areas tests can be run to determine the holding power.

If the mineral strata are to be bonded to each other, a reinforcing rod, resin bonded over part or all of its length unites the rock. The rod acts as a dowel, and the exposed end need not be threaded. A wire rope can be used, or a resin bonded glass fibre rod. Reinforcing steel bars are usually preferred because of ready availability and economy.

In solid granite, using a 1¼″ hole, and a ⅞″ bar, adhesion of about 15 tons per foot of length is obtained. In concrete about 11 tons per foot of length. Frequently the rock formation is too weak to support such loads, and an adequate factor of safety should be used.

PULL TEST

It is present practice in coal mines to use a 1⅜″ drill with a ⅝″ rock bolt having an expansion shell at the upper end. Rock drills are commonly available in 1¼″, 1⅜″, and 1½″ sizes. With the present invention, a ⅞″ bolt or rebar may be used in a 1⅜″ hole very easily and with straight holes, particularly if not too deep, a ⅞″ bar may be inserted in a 1⅛″ hole without too much binding. Obviously intermediate size bolts or rebars and drills may be used although for commercial expedience conventionally obtainable sizes are selected rather than special sizes.

Because the sizes may vary, and particularly because the strength of the rock formation itself varies greatly in commercial operations, for test purposes it is desirable to control the variables so that the separate variables can be tested individually. Results indicative of the strength of the resin itself in underground rock, and more easily reproducible, and in a laboratory are obtained by the following test:

Two internally threaded 1¼″ mild iron pipe couplings with 1¼″ American Standard straight pipe threads are used as molds, each coupling measuring approximately 1½″ in inside diameter, 1⅞″ outside diameter, and 2″ in length, are taped together using 1″ wide pressure-sensitive tape to hold them in alignment while being prepared. Either black iron or galvanized iron pipe couplings may be used. The two couplings are placed on a flat surface, such as a wooden plank, and filled about ¾ full, that is, 3″ depth of resin, with the test resin which takes about 150 grams. A ⅝″ diameter threaded mild steel rod, having eleven threads per inch (UNC), and 10¼″ long, is inserted at approximately the center of the filled coupling units until the rod also touches the bottom plank. There is approximately 7/16″ of resin between the rod and the inside wall of the coupling, measured from the crests of the threads. The resin is then cured. Unless otherwise specified, twenty-four hours at ordinary room temperature of about 75° F. is used. The threaded rod is then pulled to measure holding load.

Any prior art testing stand may be used. Conventional testing machines in material testing laboratories give good results. Such machines are expensive and not portable. A very economical and convenient portable testing unit consists of a center hole hydraulic jack such as the Blackhawk Industrial Products Company, Butler, Wis., RC-112. This consists of an annular hydraulic cylinder having a hole down the middle with a corresponding annular piston, with an internal spring for the return stroke, and which has a central hole large enough to slide over the bar. An iron washer, the center hole hydraulic jack, and a second washer are placed over the exposed end of the rod and a ⅝″ nut run down until finger tight. The jack is extended by a hydraulic hand pump with the applied pressure being measured and converted to pounds of pull. The dial can be calibrated in units of load. The load is increased to failure, which may be by (a) the bolt failing in tension, (b) the resin pulling out of the couplings, or (c) the bolt pulling out of the resin. Usually with the preferred resins the bolt fails in tension by starting to neck down after passing a maximum pull. After the pressure and pull start to drop, as the bolt necks down, pressure is preferably released. If pressure is continued until the bolt fails, the end of the bolt may be thrown by the sudden breaking. Under test conditions some type of protection is required against the possibility of the threaded end of the bolt being forcibly ejected. Commercial bolts ⅝″ in diameter usually fail between about 8.5 and 9 tons.

In view of the extreme thickness of the resin layer, any shrinkage or failure in bond would be indicated by prompt failure and any volumetric shrinkage would show up. Conventional types of resins for adhesion are usually used with a very thin "glue line" because conventional bonding resins will fail if there is a thick glue line. The unusual characteristics of the present resin composition are accentuated by study of this test.

Adhesion in the presence of water can be tested by having either the couplings or the threaded rod, or both, wet at the start of the test. Pull test results on specific resin formulations are described later.

The same hydraulic jack is conventionally used in mines to test the holding strength of bolts in place. Results in mines are less predictably uniform, as the rock structure varies. In a hard rock structure, tests are essentially the same as in the laboratory test. With a soft rock structure, partial failure of the rock formation can occur. Usually in underground or other engineering work, the length of bolt resin bonded is much greater than in the above tests, and the pull tests only confirm that the mineral formation is strong enough to hold the bolt, and the bolt itself fails in tension.

THE RESIN PER SE

In the present formulation the resin per se is an unsaturated polymerizable polyester resin mixed with a monomeric polymerizable ethylenic compound together with an inhibitor and a promoter. The alkyd components of conventional polyester resins are useful and include the usual alpha, beta ethylenically unsaturated polycarboxylic acid, which may have a saturated polycarboxylic acid present. The polyester alkyds are partially condensed with such an acid or mixtures of acids or their anhydrides by heating until reaction occurs. The degree of condensation is determined by the acid number, in accordance with conventional practice. An acid number of from about 25 to about 60 gives good results, with a range of 35 to 50 being preferred. Such resins may be made as disclosed in the examples below, or may be purchased as the alkyd component resulting from the condensation and mixed with a monomeric cross-linking agent, or purchased complete with or without stabilizers and promotors. Although styrene is preferred as the cross-linking agent for most commercial polyester resins, vinyl toluene is preferred for the present invention where the resin is to be used underground, or where the volatility and explosivity of styrene could raise a problem. Other than the fire hazard, the styrene-containing resins give excellent results. Manufacture of the resins is disclosed in many prior art patents, as above mentioned, and the resins are available commercially, such as: Polychem 167–T sold by Chemical Oil & Resin Company; Selectron R.S.N. 553 from Canadian Pittsburgh Industries, Ltd.; TVL 62036 Glidpol of Glidden, Ltd.; the Laminacs® of American Cyanamid Company, and the polyester Boat Resins of Naugatuck Chemicals.

Most of the commercial resins are sold with a quinone stabilizer and a promoter. A stabilizer gives longer shelf life, particularly if a promoter is present. The polyolpolycarboxylic acid ester are apt to have somewhat different characteristics depending upon variations in manufacture, such as the rate of heating, rate of stirring, trace impurities, etc. It is very difficult to get identical gel times, even from successive batches, because of accidental variations in manufacture. Accordingly, it is commercial practice to vary the amount of promoter and the amount of inhibitor to secure a desired gel and cure time. From about 0.002 to about 0.03% of phenolic inhibitor, based on the weight of the resin, is preferred. A greater amount of the inhibitor is used with a larger amount of promoter and sufficient inhibitor is used to give a desired shelf life of at least six months. Over about 0.03% of the phenolic inhibitor, as hydroquinone equivalent, is apt to slow down or prevent a complete cure.

Among the inhibitors, hydroquinone meets with the greatest commercial acceptance, but others such as the monoalkyl phenols, including monotertiary butyl phenol, monotertiary butyl hydroquinone, ortho-, meta- and paracresol, higher alkyl phenols, polyhydric phenols, including catechol, resorcinol, and the partially alkylated polyhydric phenols, including eugenol, guaiacol, and mixtures of these and others may be used. These inhibitors as a class are well known to those skilled in the art.

THE PROMOTER

The promoters preferred are the aniline promoters such as disclosed in U.S. Patent 2,480,928, and include tertiary monoamines which contain attached to the nitrogen atom two functionally aliphatic radicals selected from the group consisting of alkyl hydrocarbons, hydroxy-substituted alkyl hydrocarbons and aralkyl hydrocarbons and one aromatic radical selected from the group consisting of aryl hydrocarbons, azo-substituted aryl hydrocarbons, amino-substituted aryl hydrocarbons, hydroxy-substituted aryl hydrocarbons, and aldehyde-substituted aryl hydrocarbons, and salts thereof. Specific examples of this class are the following: dimethylaniline, diethylaniline, di-n-propylaniline, dimethyl-p-toluidine, dimethyl-o-toluidine, dimethyl-alpha-naphthylamine, methyl benzyl aniline, p-dimethylaminoazobenzene, N,N-dimethyl-m-aminophenol, p-hydroxy - N,N - di(beta-hydroxyethyl) aniline, p - dimethylaminophenol oxalate, p-dimethylaminophenyl acetate, and p-dimethylaminobenzaldehyde. Alkalies such as calcium hydroxide, sodium hydroxide and sodium carbonate, if present as such, or from reaction of water with cement or plaster of Paris, ammonia and ammonium sulfate also tend to act as promoters, or supplementary promoter.

From about 0.04 to 0.2% of the promoter calculated as diethylaniline equivalent is preferred. Many of the commercially available resins have some inhibitor, frequently hydroquinone and some promoter, frequently one of the tertiary amines, present and, accordingly, less additional inhibitor and promoter is required to be added in the present formulations.

THE CATALYST

The catalyst for the system includes the conventional peroxide type of catalysts, of which benzoyl peroxide is among the commercially preferred. Other peroxides are suitable, such as cyclohexone peroxide, hydroxy heptyl peroxide, 1-hydroxy cyclohexyl hydroperoxide-1, t-butyl hydroperoxide, 2,4-dichlorobenzoyl peroxide and the like.

Methyl ethyl ketone peroxide gives excellent results although more care is required in handling the ketone peroxides because of their volatility. Inorganic peroxides are also useful, alone, or mixed with organic peroxides, such as sodium percarbonate, calcium peroxide, sodium peroxide, etc.

Benzoyl peroxide is usually preferred because it is a solid with favorable price and handleability characteristics. Any of the peroxides tend towards explosivity or inflammability. For convenience in use it is desirable that the benzoyl peroxide be blended back with a compatible inert organic material, such as starch or flour, to a composition containing about 30% of the benzoyl peroxide, which thus is in non-explosive form and may be ground and handled more conveniently.

WATER-REACTIVE FILLER

A water-reactive filler is present with either the resin or the peroxide. Water-reactive fillers include Portland cement and plaster of Paris.

Additionally, inert fillers such as sand, silica rock dust, pulverized limestone or silica mill tailings may optionally be present. Such fillers are cheap and reduce the unit volume cost of the resin.

Cement or plaster of Paris tends to settle on storage. A thickening agent reduces the rate of settling or stops it completely and even if some settling has occurred the cement is more readily resuspendable. The thickening agents, in addition to their advantages in adding storage stability, also cause the mixed catalyzed resin to be thixotropic. For example, a typical resin at 75° F. using a Brookfield viscometer with a No. 4 spindle before being catalyzed showed the following viscosities:

| Spindle speed, r.p.m. | Viscosity, c.p. |
|---|---|
| 3 | 54,000 |
| 6 | 36,000 |
| 12 | 24,000 |

After being catalyzed and ready for injection the same resin showed:

| Spindle speed, r.p.m. | Viscosity, c.p. |
|---|---|
| 3 | 76,800 |
| 6 | 47,000 |
| 12 | 31,500 |

THICKENERS

Finely-divided silica, particularly pyrogenic silica, is very effective as the thickening agent. Other thickening agents, including Wollastonite, bentonite clay treated with a cationic surfactant amine, aluminum silicate treated with a cationic surfactant, aluminum silicate treated with calcium stearate, finely-divided calcium carbonate, particularly if treated with a cationic surfactant, aluminum stearate, and asbestos either as a short fiber or as a finely-divided powder. The suspending agents act on both the water-reactive and inert fillers and are thickening agents which cause the resin to become thixotropic and, hence, remain in place in overhead holes.

The thickening agent is conveniently added to the resin paste. It is also effective if in the catalyst system. The thickener can be in part added to each of the resin paste and the catalyst although usually for convenience it is mixed with only one of these components. Asbestos tends to shorten shelf life if used without the water-reactive filler. When used with Portland cement, excellent shelf life is obtained.

With either the resin paste or the catalyst, whichever one is free from water-reactive filler, is some water. Usually the amount of water preferred is about that which will react with the water-reactive filler. Half of this quantity of water gives good results as it reacts with part of the water-reactive filler and in wet locations, where the resin is to be used in wet holes, less water can be added so that some of the water is supplied from the adjacent rock formation. Up to 25% water may be used with the larger quantities being preferred where there are larger quantities of water-reactive filler and vice versa. Based on the final resin volume from 5 to 10% of cement with one component for storage and from 1 to 10% of water, based on the final composition, is a preferred range giving storage stability, convenience of use, and a strong final resin with a minimum of shrinkage.

To aid in keeping the water mixed in with either the resin or the catalyst, an emulsifying agent is preferred. The polyoxyethylated vegetable oils are compatible with the system, give good suspension, give good emulsification of water, and good storage life. Other conventional wetting agents which are compatible with the resin may be used, such as polyoxyethylated castor oil, or the equivalent polyethylene glycol ethers of castor oil, or a polyoxyethylated alkyl phenol, such as

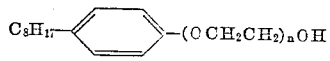

and

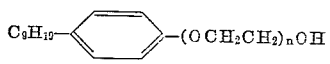

where $n$ is a small whole number. Commercially, mixtures are available where $n$ is from 3 to 16. A range of 3 to 10 is preferred. Such mixtures are sold as Tricon X-45 and Tricon N-57, and also under other names from various sources.

In a preferred embodiment water is emulsified in the resin using an emulsifying agent and the emulsion is thickened with pyrogenic silica. The B component is a 30% benzoyl peroxide in flour mixed with Portland cement. Conveniently from 2 to 20% dibutyl phthalate, based on the weight of this mixture, is added to prevent dusting and increase the facility of mixing of the catalyst with the resin. Other alkyl phthalates such as dimethyl phthalate, mineral oil, and castor oil are also useful.

The theory of action of the present resin system in part is somewhat contraditory. For example, asbestos or pyrogenic silica cause cement to remain suspended in the resin during storage. Also, if cement is present in the resin formulation, with the water being present with the catalyst, the cement retards gelation by asbestos, and the asbestos keeps the cement suspended.

Either pyrogenic silica or the emulsifying agent keeps water dispersed in the resin or maintains the catalyst system suspended so that the catalyst does not settle out if water is present with the catalyst.

A practical working viscosity of the resin system after mixture is in the range of 12,000 to 150,000 centipoises, measured with a Brookfield viscometer at spindle speeds of 3 to 6 r.p.m. The final products of the present invention have a high viscosity at this rate of stirring, and as they are thixotropic, the effective viscosity becomes far greater as the stirring rate drops.

It is quite surprising that the water does not adversely affect the gel time or cure rate of the resin to such an extent that it does not harden. Actually, the water improves the properties as it causes the resin to develop a somewhat imperfect cure which is sufficient for the resin to have the required strength but minimize shrinkage as most of the shrinkage occurs at the very end of the curing phase.

The resin can be transferred into the bore hole conveniently by mixing the resin component and the catalyst component in a tin can having therein a piston, which piston has a hole in the center, in a donut-shaped configuration which permits the resin to be expressed from the container through the hole in the piston to a transfer tube 70. Preferably the transfer tube is of a non-adherent material such as polyethylene, or polypropylene. The resin composition remains in the polyethylene tube until the polyethylene tube is inserted into a drill hole, after which a plunger acts as the piston in the transfer tube permitting the filling of the resin from the far end of the hole towards the working face and the resin when thus in place, because of its thixotropic nature, remains in place while the tube is withdrawn. Where desired, a reinforcing steel bar is pressed into the bore hole and displaces the resin around the reinforcing member, thus giving complete and intimate contact between the resin, the reinforcing member, and the drill hole 48. The resin composition may in part be forced between rock strata causing the rock strata to adhere to each other as well as to the reinforcing member, thus giving a reinforced rock-to-rock adhesion, also strengthening the formation.

Another method of transferring the resin into the drill hole is to mix the resin in the shipping container or a tin can big enough for the mixing of the resin component and the catalyst component and then place the resin container in an outer pressure pot which can be closed off. A dip tube extends down into the resin container so that when air pressure is applied to the pressure pot the resin composition is forced up through the dip tube into a transfer tube or directly through a long loading nozzle into the holes drilled in a mineral formation. The transfer tubes can also be loaded by pump action by immersing the end of the transfer tube in the resin and drawing back on the piston, like in effect to loading a grease gun; or by vacuum as shown in FIGURE 12.

Other methods of loading will suggest themselves to those skilled in the art considering that the mixed resin is comparatively thick and that it is thixotropic so that once it is placed in a drill hole it will stay put.

For best holding the drill hole should be clean, that is free from powder, as for example by blowing it out with air or washing it out with water so that the resin will adhere to the mineral formation rather than loose dust particles. It is distinctly unusual to find a resin that so firmly unites to wet mineral formations.

Where desired, an injection bolt, of the type shown in FIGURES 6, 7, and 8, permits the transfer of the resin from a supply hose into the drill hole in rock, with appropriate bleeding of air through the bleed tube. In porous formations the bleed tube is not required as the trapped air can escape into the formation. Usually a bleed tube is preferred to insure that an air trap does not remain above the leakage point in the formation. The structures shown in FIGURES 6, 7, and 8, permit injection pressures up to about 300 pounds per square inch which forces the resin formulation into fissures and cracks in the mineral formation, adhesively uniting the rock to itself, as well as to the reinforcing bolt or rod.

Where a porous formation is encountered and it is

15 desired to increase the permeation of the resin into the rock formation the bolt system shown in FIGURES 6, 7, and 8 may be used with a resin having little or no cement or suspending agent to give a thinner resin which more easily flows into the formation. Such a bolt positively retains the resin so that a resin having Newtonian viscosity may be used. With thinner resins for such purposes, additional promoter and/or catalyst may be required for a particular reaction rate as the reaction of water with the water-reactive filler such as Portland cement or plaster of Paris increases the alkalinity of the system and the increased alkalinity also increases the polymerization rate.

Various patterns of bolts in different mineral formations using reinforcing rods alone in some holes, and with end plates and bolts to hold the surface of the rock in others, and the use of some holes containing principally injected resin to inject resin into the rock formation and others using bolts throughout will suggest themselves to those skilled in the art, depending upon the characteristics of the mineral formation being worked and the ultimate purpose of the reinforcing.

As the present resin when hardened is very strong, the resin should not be allowed to set in injection equipment as it is frequently more economical to junk the equipment than clean it. Polyethylene tubes are an exception as if the resin is permitted to harden in such tubes it does not adhere to the polyethylene, and the tube may be flexed and the resin broken away. For steel equipment the resin can be removed by burning, using a suitable heat source, such as a gasoline torch.

The invention is exemplified below for purposes of illustration with details and specific ranges being set forth. The scope of the invention is defined in the appended claims.

In the specification and claims all parts are by weight unless otherwise indicated.

Example 1

A polyester resin was prepared, following the procedure of Example 1 of Patent 3,091,936, as follows:

Into a suitable reaction vessel equipped with stirrer, thermometer and an air-cooled reflux condenser were charged 1910 parts maleic anhydride, 1480 parts of phthalic anhydride and 2540 parts of propylene glycol. With carbon dioxide passing through the reaction mixture at a rate capable of providing an inert atmosphere above the surface of the mixture, the reactive ingredients were heated gradually with stirring to a temperature of 160° C. Heating was continued at an indicated esterification temperature until the acid number had dropped to 38. The time required to achieve this degree of condensation was approximately 20 hours. Thereupon, the reaction mixture was cooled to 80° C. and the hot polyester resin was cut with methylstyrene in the proportion of resin to methylstyrene of 70:30, respectively.

While the polycarboxylic acid component of the reactive resin of this example was a mixture of an alpha, beta ethylenically unsaturated dicarboxylic acid and a non-polymerizable dibasic acid, one may use exclusively an alpha, beta ethylenically unsaturated polycarboxylic acid such as the maleic acid of this example or any one of such acids like fumaric, aconitic, itaconic, citraconic and mesaconic or even combinations of same. Where a non-polymerizable polycarboxylic acid is employed it must be used in combination with an unsaturated acid of the type mentioned and preferably should not constitute more than 70% by weight of the total amount of the polycarboxylic acids employed. Examples of non-polymerizable acids include such as oxalic, malonic, succinic, glutaric, succinic sebacic, phthalic adipic, pimelic, submeric azelaic, tricarballylic, citric, tartaric and the like. If available, the anhydrides of these acids may be substituted therefor in whole or in part.

In addition to the propylene glycol employed in the preparation of the resin of this example, one may use other types of glycols, such as ethylene glycol, diethylene glycol, dipropylene glycol, triethylene glycol, tetraethylene glycol, butanediol-1,2, butanediol-1,3, butanediol-1,4, pentanediol-1,2, pentanediol-1,4, pentandiol-1,5, hexanediol-1,6, neopentyl glycol and the like. Polyhydric alcohols having more than two hydroxyl groups may be used, if used in combination with a predominant amount of glycol. Examples of polyols having more than two hydroxyl groups include glycerol, trimethylol ethane, trimethylol propane, pentaerythritol, dipentaerythritol, sorbitol, mannitol, adonitol, dulcitol, arabitol, xylitol, etc.

As exemplified in the formulation of the specific resin of this example, it is desirable that the polyhydric alcohol and preferably dihydric alcohol be employed in an amount which represents an excess of approximately 10 to 20% above the stoichiometric quantity required for a substantially complete esterification of the acid or acids employed.

The polyhydric alcohol and polyhydric acid and the various mixtures of each that may be employed should be reacted sufficiently to produce final reactive material having an acid number desirably not greater than 60. The preferred acid number range for the resin to be employed in this invention is from about 35 to 40.

The cross-linking agent for the reactive resin may be any one of a number of polymerizable monomeric materials having a $CH_2=C<$ group and a boiling point in excess of about 60° C. The agent employed in this example was an isomeric mixture of ring substituted methylstyrenes, also commonly called vinyl toluene. This type of substituted styrene is preferred in the compositions to be used in underground work or enclosed areas because of its rather high flash point charcteristics. The high flash point of this compound permits it to be used with relative safety in closed areas where safety requirements are of an important consideration. However, other suitable cross-linking agents include styrene itself, 2,4-dimethylstyrene, 2,5-diethylstyrene and the like. Alkyl esters of acrylic and methacrylic acids may also be used as the cross-linking material. Also, aliphatic vinyl esters may be used including vinyl acetate, vinyl butyrate, vinyl laurate, vinyl stearate, acrylonitrile, methacrylonitrile, etc. Acrylamide and methacrylamide may likewise be used. These polymerizable monomeric materials containing the $$CH_2=C<$$

group may be used singly or in combination with one another.

The ratio of the unsaturated polyester resin to the monomeric cross-linking agent may be varied over a wide range. The unsaturated resin content may, therefore, range from about 10 to about 90 parts to a corresponding 90 to 10 parts of polymerizable monomer. For the majority of the purposes, however, the active polymerizable components comprise from about 40 to about 60 parts by weight of the unsaturated resin and correspondingly from about 60 to 40 of the polymerizable monomeric material.

Other suitable unsaturated polyester resins are disclosed directly or by incorporation in Patent 3,091,936.

Example 2

To 84.5 parts of the resin from Example 1 was added 0.006 part of hydroquinone as an inhibitor, 0.9 part of Emulphor EL–719, a proprietary hydrophilic, non-ionic surfactant, made by polyoxyethylating vegetable oil, 0.025 part of diethylaniline, 1.0 part vinyl toluene, 9.4 parts water and 4 parts of Cab-O-Sil, a propietary pyrogenic colloidal silica. A separate catalyst component was prepared by mixing 18 parts of Portland cement, 9 parts of Luperco AA, a proprietary peroxide catalyst, essentially a fine powder containing 30% benzoyl peroxide and 70% of an inert organic diluent (the composition is frequently used for bleaching flour), and 3 parts of dibutylphthalate. The individual components are stable for at least six months, at 70° F. The one hundred parts by weight of resin mixture are added to the 30 parts of the catalyst composition to form the finished mixed resin. Just before the time of use, the two components are mixed, drawn into a transfer tube and from the transfer tube ejected into a drill hole, filling the hole in the rock from the bottom, after which a reinforcing rod is inserted into the resin composition. After curing for two weeks at 55° F., on pull testing, using a ⅞" reinforcing rod in a 1¼" hole in a hard igneous rock with the hole wet when the resin was introduced, the results were:

TABLE

| Length of Cemented Portion | Load Sustained Tons | Remarks |
|---|---|---|
| 4 in | 9.0 | Resin slipped against rock. |
| 4 in | 10.5 | Do. |
| 6 in | 17.0 | Rod broke at thread. |
| 6 in | 15.0 | Threads on rod stripped. |
| 8 in | 15.0 | Do. |
| 8 in | 15.0 | Rod broke at thread. |
| 10 in | 17.0 | Do. |
| 10 in | 16.0 | Do. |
| 24 in | 17.0 | Do. |

*Example 3*

In accordance with conventional practice in a reaction vessel designed to maintain an inert atmosphere, there is charged 258 parts of propylene glycol, 227 parts of maleic anhydride, and 115 parts of phthalic anhydride. The mixture is protected by an inert atmosphere of carbon dioxide and heated gradually with stirring until the acid number drops to 35 to 40. The reaction mixture is cooled to below the boiling point of vinyl toluene and the hot resin is mixed with 400 parts of vinyl toluene.

*Example 4*

Under a protective atmosphere there is mixed and heated to react:

| | Parts |
|---|---|
| Propylene glycol | 273 |
| Phthalic anhydride | 169 |
| Maleic anhydride | 225 |

The mixture is heated to an acid number of 25, the mixture is partially cooled and thereto is added 332 parts of styrene, and mixed until homogeneous. During the blending 0.14 part of hydroquinone and 1.0 part of diethylaniline is added.

*Example 5*

In accordance with conventional polyester resin manufacturing processes, there is reacted together:

| | Parts |
|---|---|
| Propylene glycol | 238 |
| Maleic anhydride | 116 |
| Phthalic anhydride | 246 |

The mixture is heated to an acid number of about 50, cooled sufficiently to not boil off the styrene and there is added 400 parts of styrene, and blended until homogeneous.

*Example 6*

In a resin manufacturing kettle under an inert atmosphere of nitrogen there is mixed together:

| | Parts |
|---|---|
| Propylene glycol | 212 |
| Diethylene glycol | 67 |
| Phthalic anhydride | 280 |
| Maleic anhydride | 121 |

The mixture is heated to an acid number of 35, partially cooled and 320 parts of vinyl toluene are blended therewith. To the mixture is added 1.5 parts of diethylaniline, 0.16 part hydroquinone, and 0.2 part of ethylene guanidine hydrochloride dissolved in diethylene glycol. About a 10% concentration of ethylene guanidine hydrochloride in diethylene glycol is used as a matter of convenience. This resin contains both promoter and inhibitor and may be stored before formulation is completed.

*Example 7*

Using the procedure described in Example 4, a resin is prepared containing:

| | Parts |
|---|---|
| Propylene glycol | 115 |
| Dipropylene glycol | 197 |
| Maleic anhydride | 135 |
| Phthalic anhydride | 203 |

The alkyd produced is cut while hot with 350 parts of vinyl toluene.

*Example 8*

Using the cooking procedure set forth in Example 3, a resin is prepared containing:

| | Parts |
|---|---|
| Ethylene glycol | 55 |
| Dipropylene glycol | 235 |
| Maleic anhydride | 194 |
| Phthalic anhydride | 59 |
| Adipic acid | 57 |

The alkyd is mixed with 400 parts of vinyl toluene.

*Example 9*

Under an inert atmosphere is heated and thereby reacted a mixture containing:

| | Parts |
|---|---|
| Diethylene glycol | 326 |
| Phthalic anhydride | 109 |
| Maleic anhydride | 107 |
| Isophthalic acid | 109 |
| Adipic acid | 49 |

The mixture is heated to an acid number of 40, partially cooled and 300 parts of vinyl toluene added. To the mixture is added 0.10 part of hydroquinone, 0.55 part cobalt octoate, 1 part of diethylaniline, 3 parts of a 10% solution of ethylene guanidine hydrochloride in diethylene glycol (0.3 part real ethylene guanidine hydrochloride).

*Example 10*

A mixture is prepared by heating:

| | Parts |
|---|---|
| Diethylene glycol | 315 |
| Phthalic anhydride | 320 |
| Maleic anhydride | 65 |

In an inert atmosphere to an acid number of 45 and after cooling 300 parts of styrene is added. To the mixture is added 0.24 part of mono-tertiary butyl hydroquinone, 0.6 part cobalt octoate, 1.5 parts of diethylaniline, and 1.0 part of 10% ethylene guanidine hydrochloride in diethylene glycol (a total of 0.1 part real ethylene guanidine hydrochloride). This resin when polymerized tends to be somewhat rubbery.

*Example 11*

To 84.25 parts of the resin from Example 4 is added 0.9 part of polyoxyethylated vegetable oil, as an emulsifying surfactant, 0.25 part of diethylaniline, dissolved in 1.0 part of vinyl toluene, 9.4 parts of water and 4.0 parts of pyrogenic silica. After mixing this material is packaged in a can as Component A. 18 parts of Portland cement are mixed with a mixture of 2.7 parts of benzoyl peroxide and 6.3 parts of starch. The starch and benzoyl peroxide are premixed and ground together. Benzoyl peroxide alone is a dry powder and is explosive in nature. When mixed with an inert organic diluent, such as starch or flour, so that the final product contains 30% benzoyl peroxide, the material may be ground in a mill and handled as a dry powder with a minimum risk of explosion. The powdered mixture of cement, benzoyl peroxide and starch has added thereto 3 parts of dibutyl phthalate which slightly moistens the powder so that it may be handled without dusting and blends more rapidly into the resin paste. This component is stored in a separate can as Component B. As thus prepared, each component is storage stable.

Preferably the can containing Component A is large enough to be used as the mixing container. Component B is poured into the can containing Component A, and the composition stirred until homogeneous. As Component A is essentially white and Component B is grey, freedom from streaks and a uniform color blend shows adequate mixing. As so mixed the working time is:

| | Minutes |
|---|---|
| 45° F. | 30 |
| 60° F. | 20 |
| 75° F. | 15 |
| 90° F. | 8 |

For use in overhead bolt holes, a 1⅛" O.D. poyethylene tube is filled by suction with the resin, a plunger inserted as a piston in one end of the tube and the polyethylene tube inserted to the far end of a drilled overhead hole in rock. By pressure on the piston the resin is forced out of the polyethylene tube. By pulling the polyethylene tube out of the hole at a rate equal to the filling rate, the entire cross-section of the hole is resin filled. The piston passes into the hole at a faster rate than the tube is withdrawn, because of the larger diameter of the drill hole. The hole can be filled from the far end without trapping air. The resin composition is sufficiently thixotropic to be retained in a drill hole. After the drilled hole is filled to the desired depth, the polyethylene transfer tube is removed and a reinforcing member is inserted. Conveniently a ⅞" diameter reinforcing bar, commercially used for concrete, is inserted and as it is inserted the resin in the partially filled drill hole is squeezed out as the bar is inserted. The volume of resin transferred into the drill hole is such that when the reinforcing bar is inserted to the desired depth, the bolt is in contact with the resin for the desired length. The operation is illustrated in FIGURES 12, 13, and 14. For most underground mining operations, it is desired that the drill hole be filled to the exposed face with resin so that the reinforcing bar is bonded throughout the entire length of the hole to the rock structure. Thus various lamini of the rock structure are bonded through the bolt to each other. If the rock is to be reinforced without an external nut on the rod, the reinforcing bar or rod has such length that there is no exposed portion after being inserted. Conveniently, on inserting the bar is bent slightly so that it will be retained by the bend in the bolt in the bolt hole as it binds in the straight hole and is thus retained in the hole as the resin sets.

The resin firmly retains the bolt in the hole. The characteristics of the cured resin are set forth in the following table, as compared with concrete.

TABLE

| Item | Resin After 48 Hrs. at 70° F. | Fully Cured | Plain Concrete |
|---|---|---|---|
| Specific Gravity | 1.32 | 1.32 | 2.4. |
| Compressive Strength, p.s.i. | 10,000 | 20,000 | 2,000–8,000. |
| Tensile Strength, p.s.i. at— | | | |
| 77° F. | 2,000 | 8,100 | 250–700. |
| −40° F. | | 8,500 | |
| Tensile Elongation, Percent | 1.0 | 2.6 | |
| Flexural Strength, p.s.i. at 77° F. | 3,200 | 12,300 | 400–1,200. |
| Volumetric Resistivity, ohms/cm. | | $2.0 \times 10^{16}$ | |
| Surface Resistivity, ohms | | $1.1 \times 10^{12}$ | |
| Dielectric Constant | | 3.5 | |
| Coefficient of Thermal Expansion, in./in./° F. | $8.7 \times 10^{-5}$ | $4 \times 10^{-5}$ | $4.7 \times 10^{-5}$. |
| Thermal Conductivity, B.t.u./hr./ft.²/° F./in. | | 1.3 | 14.4–24.0. |
| Corrosion Resistance | | Not attacked by dilute acids, alkalis, or salts. Slowly decomposed by strong caustic or conc. sulfuric acid. Resistant to almost all solvents. | Disintegrates in dilute sulfuric acid and sulfate-bearing waters. |
| Solubility | | Insoluble in water, oils, solvents, acids and alkalis. | |
| Deflection Temperature under load ° F. | 176 | 221 | |

As indicative of the bonding strength which may be obtained, the following table represents tests run in hard igneous rock, using a 1¼" drill hole and a ⅞" reinforcing rod. A hydraulic center hole jack, as above mentioned, was used to pull out the reinforcing rod. For this test, reinforcing rods were used which had the exterior end of the rod threaded with ¾" UNC threads to give a grip.

TABLE

| Temperature | 55° F. | 55° F. | 90° F. | 90° F. | 90° F. |
|---|---|---|---|---|---|
| Cure Time | 2 Weeks | 3 Weeks | 1 Week | 2 Weeks | 2 Weeks |
| Hole Condition | Wet | Wet | Wet | Wet | Wet |
| ⅞" rebar bolt with | | | | | Rebars hammered 5 min. prior to pulling |
| Resin Length: | | | | | |
| 4" | Slipped in hole 10.5T | Slipped in hole 10.5T | | | |
| 6" | Bolt broke 17.0T | Slipped in hole 14.0T | Slipped in hole 11.0T | Bolt broke 14.5T | Slipped in hole 7.0T |
| 8" | Bolt broke 15.0T | Bolt broke 15.0T | Slipped in hole 9.0T | Bolt broke 14.5T | Slipped in hole 8.0T |
| 12" | Bolt broke 15.0T | Bolt broke 16.0T | Slipped in hole 12.0T | Bolt broke 15.0T | Bolt broke 15.0T |
| 18" | Bolt broke 16.0T | Bolt broke 15.5T | Bolt broke 18.0T | Bolt broke 15.0T | Bolt broke 17.0T |
| 24" | Bolt broke 16.5T | Bolt broke 14.5T | Bolt broke 15.0T | Bolt broke 16.0T | Bolt broke 15.0T |

T=Tons.
In tests where Resin slipped in hole, bolts were still able to support loads of 1 ton less than the loads producing slippage.

The tests are not completely reproducible because of variations in the roughness of the drill hole, variations in the thoroughness of cleaning of the drill hole, variations in the machine work in threading the bar, etc. The test does show that where desired a fairly short resined length gives good retention and where retention only is desired and the rock structure is known to be solid, a bolt resined for only part of its length gives good pull strength. With softer rock, or where it is desired to bond strata of the rock together, a longer resined length is required, and for rock which may exhibit zones of weakness it is strongly recommended that any errors in resined lengths be on the conservative side to compensate for unexpected faults in questionable rock structure. The choice as to whether the end of the rod is threated to support the exposed rock structure by a plate and nut, such as in mine roof bolting; or to support engineering structures such as, for example, overhead trolley lines; or is used unthreaded to hold zones of the rock to each other varies with the engineering requirements at the point of usage.

Where zones of weakness exist, part of the resin is forced into such zones, and gives additional strength by adhesively uniting the rock to a more monolithic configuration.

*Example 12*

The rate of setting of the mining resin may be increased at low temperatures by adding additional promoter. For example, in the preceding example to secure full cure in 24 hours at 45° F., an additional 0.2% of dimethylaniline is added to the resin, based on the weight of the resin component before, or concurrent with, or after the addition of the catalyst component in container B. Mixing is more convenient if the dimethylaniline is diluted somewhat with vinyl toluene using a 10 to 25% solution and the mixing is accomplished before the addition of Component B. After adding the cement and catalyst, which is Component B, the mixture becomes thicker and more difficult to stir. The additional dimethylaniline or other promoter is used only where the cure rate at low temperatures is to be increased. The exact quantity to be added is a matter of choice with the operator, depending on the ambient temperature and the desired cure, it being noted that as the cure time decreases, the pot life time also decreases so that if a 24-hour cure time is desired, the pot life is about 30 minutes. The final product is essentially the same, as to characteristics and strength.

The cure time is in part affected by the mass of resin curing. The curing is a heat-generating (exothermic) reaction and where the resin is in a large mass the temperature of the curing resin may rise considerably, as much as 300° F. in large masses. In the normal rock bolting operation the cooling effect of the adjacent rock prevents the resin from warming much above the original temperature of the rock.

*Example 13*

Iron salts are known to decrease the storage life and the gel time of polyester resins. It has been found that when an appreciable amount of uncompensated ferric ion is present the final cure is also inhibited so that the resin may never adequately cure. It has now been found that the increased speed of gel resulting from ferric ion may be utilized without harm to the final cure if ammonium sulfate is also present.

A mixture is prepared of 2 parts of ferric ammonium sulfate 24H$_2$O, 2½ parts ammonium sulfate and 1 part of water. The material is slurried and may be stored in polyethylene packages until time for use. The mixture of ferric ammonium sulfate and ammonium sulfate may be used in addition to, or instead of additional dimenthylaniline to decrease the cure time at low temperatures.

In underground tests at 45° F. 4½ parts of the above ferric ammonium sulfate-ammonium sulfate mixture is added to 100 parts of the resin paste and thereto is added Component B containing the cement and catalyst. The resin cures in about 24 hours at 45° F. The exact quantity to be added is selected for particular usages with a larger quantity giving a more rapid cure and a smaller quantity giving a less rapid cure, having due regard to the temperature of the operation.

The ferric ammonium sulfate-ammonium sulface combination as a supplementary promotor has the advantages of being easy to package, easy to handle, non-toxic, and low in cost. Diethylaniline has the advantage of minimum discoloration of the resulting cured resin. For most underground operations the color of the cured resin is of no significance.

These salts can also be added to the resin in the form of dry salts, but they react more slowly in this form.

*Example 14*

A mixture is prepared of 100 parts of the resin mixture of Example 6, 7 parts of water, 1 part of polyoxyethylated vegetable oil and 4 parts of pyrogenic silica. The mixture is blended together and used as the outer component in a dual package as of the type shown in FIGURE 9. A catalyst paste is prepared by grinding together 9.6 parts of benzoyl peroxide and 22.4 parts of flour. To the powder is added 64 parts of Portland cement, and the solids are blended; 5 parts of asbestos shorts and 20 parts of dibutyl phthalate are added. 100 grams of the catalyst paste are filled in a tube formed by sealing a laminate on three sides, as shown in FIGURE 1. A laminate of polyester film on the outside with polyethylene on the inside, of the type sold under the trademark "Scotch-Pak," is impermeable to the resin and the catalyst and prevents premature interaction. An inner compartment 21 about 18" long is used, as shown in FIGURE 1. The inner compartment containing the catalyst paste and 300 grams of the resin paster are placed in an outer compartment 25, made from a 4¼" by 26" sheet of the same laminate and the product is sealed to form a sausage package. The end is bent over, as shown in FIGURE 9, in order that the sausage may be more easily inserted in a drill hole with an insertion rod 65. The packages thus formed are conveniently stored in cardboard tubes to prevent accidential damage, and for convenience in handling. The compositions are stable at room temperatures of 70° F. to 80° F. for at least six months. At the time of use the packages are hooked on the end of the insertion rod and inserted into overhead holes drilled in rock. The packages fit into a 1¼" diameter hole and one or more packages, frequently called "sausages" are inserted to give the desired resin volume for a drill hole. As illustrative, two such packages were inserted in a 4½" drill hole. The end of a reinforcing bar was burned off to have jagged edges and rotated at 250 r.p.m. as it was inserted upward into the hole, using an impact wrench. As the reinforcing bar moved up it tore both the inner and outer packages and mixed the resin, Component A, with the catalyst, Component B. The laminate of the packages was shredded during the process. At 250 r.p.m. a minute and a half was used to insert the reinforcing rod into the hole. The reinforcing rod was disconnected from the power driven impact wrench used for rotating the rod, and a short wooden wedge jammed between the reinforcing rod and the rock hole to wedge the reinforcing rod in the hole. The resin was thixotropic and did not flow out. The amount of catalyst used is comparatively large and, accordingly, sets rapidly.

At 45° F. the cure is completed in 24 hours; at 60° F. in 18 hours; at 70° F. in 8 hours; and at 90° F. in 1 hour.

The pull tests on the resin are approximately the same when placed by this method or placed by the methods in the preceding Examples 12 and 13. The laminate shreds do not weaken the support.

In use, the number of packages and the depth of the drill holes are adjusted for working conditions in a particular mine. The same method of insertion may be used for horizontal or downwardly drilled holes; in anchoring together rock structures where threaded rods are used to anchor engineering structures to the rock, as for example in suspension bridge anchorages; or missile silo construction.

Example 15

The resin packages of Example 14 are inserted in underground drill holes in the wall of a rock chute. ⅞" Fiberglas reinforced plastic bars with a roughened end are inserted as they are rotated, the bar being of such length that it extends substantially completely into the hole and the resin fills the hole to the working surface. A pattern of reinforcing rods is used. As rock is dumped down the ore passage it abrades and wears against the walls of the ore passage but the reinforcing rods hold the rock structure together. As the rock gradually abrades away, the ends of the Fiberglas rods are also worn away so that metal snags from the exposed reinforcing rods do not obstruct the ore passage, as is the case with conventional reinforcing rock bolts in underground passages. Additionally, there are no exposed ends of the reinforcing rod to be hammered by rock and by transmitted vibration cause damage to the reinforcing rod, or the bond between the reinforcing rod and the resin or between the resin and the rock, or in the rock structure.

Example 16

90 parts of the resin from Example 4 are mixed with 10 parts of water, 4 parts of pyrogenic silica, 1 part of polyoxyethylated vegetable oil, and 0.2 part of additional diethylaniline. This material is placed in container A as the resin paste.

In container B is a mixture of 9 parts benzoyl peroxide and 21 parts of flour, ground together, to which is added 60 parts of Portland cement, and then 10 parts of dibutyl phthalate. The catalyst paste thus prepared is placed in container B in the ratio of 30% by weight of the resin paste in container A. Both are storage stable. The two components, A and B, are mixed at the point of use. When tested by pouring into two 1¼" pipe sleeves with a ⅝" bolt, as above described, after 2 hours at 75° F. a pull load developed for 17,900 pounds on 4" of resin broke the rod. The gel time at 70° F. is 5 minutes.

Portions of the mixed resin were drawn into a polyethylene tube, using an aspirator, as shown in FIGURE 12, and transferred to the far end of bolt holes in rock. An expansion shell on the end of a bolt was inserted into the resin-containing bolt hole. The expansion of the shell held the bolt against a small temporary load and on hardening retained the bolt that in 4' holes a ⅞" bolt broke before resin failure. Tightening of a bolt against the rock face gives a pre-stressed bolt, and preloaded rock formation.

Example 17

Example 16 is repeated substituting 4 parts of silica aerogel for the 4 parts of pyrogenic silica. The silica aerogel is prepared from silica hydrogel by displacing water by an organic solvent such as alcohol and then evaporating the alcohol. A suitable product is sold commercially under the trademark Santo-Cel. (See U.S. Patent 2,887,461, supra.)

On the ⅝" bolt test, in 1¼" couplings, the bolt failed at 17,700 pounds, after 24 hours' cure time.

Example 18

As illustrative of other thixotroping agents, Example 16 is repeated substituting 20 parts of bentonite clay, which clay has been treated with a cationic surfactant amine, for the 4 parts of pyrogenic silica. A suitable such clay is sold under the trademark Geltone. The gel time is comparatively short, about 5 minutes. On the test using a ⅝" bolt in two 1¼" pipe couplings, a typical batch of the resin stood a test of 15,200 pounds, after 24 hours.

For hard rock formations, the resin was loaded into a polypropylene transfer tube, transferred to the bottom of a 1¼" drill hole and a ⅞" reinforcing rod inserted. 36" of the rod was bonded by the resin. After 24 hours' cure, at 70° F., on test the rod broke before resin failure. In a limestone rock test using a 6'1¼" drill hole, 48" of resin bonding and a ⅞" reinforcing bar, the bar failed before resin failure.

Example 19

Wollastonite is a naturally occurring calcium silicate. 11 parts of the commercial grade sold by the Cabot Corporation is substituted for the pyrogenic silica in Example 16. A thixotropic paste is formed which is readily transferred to and retained in drill holes having a diameter from 1" to 1½", or larger.

When tested using a 4¼ foot, ⅞" bar in a 1¼" hole in granite, the bar failed before resin failure.

Example 20

Example 16 was repeated using 20 parts of aluminum silicate treated with a cationic surfactant instead of the pyrogenic silica. On test the ⅝" bolt withstood a load of 16,500 pounds. On a 4 foot, ⅞" reinforcing rod, full length bonded with resin in a concrete test block, the rod fails before resin failure, after curing for 24 hours at 70° F.

Example 21

Example 16 is repeated using 28 parts of a finely-ground coated calcium carbonate sold under the trademark Super Multifex instead of the pyrogenic silica. The gel time is 6 minutes. On the ⅝" bolt test the bolt breaks before resin failure and on a 4 foot reinforcing bar, ⅞" diameter, resin bonded full length in hard rock, the bar fails before resin failure.

Example 22

To 100 parts of the resin prepared as in Example 5 is added 0.018 part of hydroquinone and 0.17 part of diethyl aniline. After mixing there is additionally added 11 parts of water and 23 parts of finely-divided aluminum silicate water with ½% of magnesium stearate sold under the trade designation A.S.P. 101. 1.1 parts of polyoxyethylated octyl phenol, from the condensation per mol with 5 mols of ethylene oxide is added. This forms resin Component A. To the resin component in the ratio of 10 parts resin component to 3 parts catalyst is added the catalyst Portland cement composition set forth in Example 16. A thixotropic resin paste is formed which holds a resin bolt to failure of the bolt in hard rock, using a 4 foot resined length for a ⅞" bolt.

Example 23

To 100 parts of the resin from Example 8 is added .025 part of hydroquinone and .18 part of diethyl aniline. The composition is blended and thereto is then added 11 parts of water, 11 parts of aluminum stearate, and 1.1 parts of polyoxyethylated vegetable oil. At the time of use the above resin composition is blended in the ratio of 10 parts to 3 parts of the catalyst Portland cement composition as in Example 16 and rapidly transferred to a bolt hole. A ⅞" bolt resined for 5 feet in a limestone formation failed by bolt breakage.

Example 24

To 100 parts of the resin from Example 7 is added 0.017 part of hydroquinone and 0.3 part of diethyl aniline, the mixture blended and thereto is added 11 parts of water, 11 parts of aluminum stearate, 1.1 parts polyoxyethylated vegetable oil, and the mixture again blended. When used in the 10:3 ratio with the catalyst Portland cement from Example 16 the resin gelled rapidly and showed a ⅝" bolt failure of 15,700 pounds by bolt failure in the pipe sleeves. When tested in a horizontal hole in a hard sandstone, a ⅞" reinforcing rod resined for 6 feet failed by rod failure.

Example 25

To 100 parts of the resin from Example 9 is added 0.017 part of hydroquinone and 0.28 part of diethyl aniline. After blending with the resin there is added 43 parts of Portland cement and 10 parts of asbestos fibers. As a catalyst system is used, a mixture of 10 parts of water, 4 parts of 96% benzoyl peroxide and .13 part of polyoxyethylated vegetable oil.

The asbestos fibers act as the suspending agent to keep the Portland cement from settling out of the resin paste. The finished catalyzed resin is thixotropic. When tested by the 5/8" bolt in the pipe couplings and a 7/8" reinforcing rod resined for 4½ feet in a test block of concrete in each instance the resin held until metal failure.

Example 26

To 100 parts of the resin from Example 10 is added 43 parts of Portland cement, 10 parts of very fine powdered asbestos, sold under the trade designation Fibrene C-400, and the mixture stirred until uniform. A catalyst system is prepared from 10 parts of water, 4 parts benzoyl peroxide and 0.13 part of emulsifier. The components are stored separately and mixed at the time of use. After one week in concrete a 7/8" test reinforcing bar resined for 4 feet fails by metal fracture.

Example 27

To 100 parts of the resin from Example 4 is added 43 parts of Portland cement, 4 parts of pyrogenic silica, 1.4 parts of polyoxyethylated vegetable oil, and .27 part of diethyl aniline. After mixing a storage stable resin composition results. The separate catalyst is a mixture of 15 parts of a powdered mixture containing 30% benzoyl peroxide and an organic diluent and 15 parts of water, the suspension of which is aided by 0.3 part of polyoxyethylated vegetable oil. The resin paste and catalyst are blended at the time of use. The product has a gel time of about 2 minutes, and must be used promptly. On test a 5/8" bolt in the pipe sleeves withstood 17,900 pounds pull and on testing using a 7/8" reinforcing bar in a concrete block designed for a machine foundation, the metal failed before the resin with a resined length of 4½ feet for a 7/8" bar.

Example 28

To 100 parts of the resin from Example 4 is added 11 parts of water, 4.3 parts of pyrogenic silica, 1.1 parts of polyoxyethylated vegetable oil, and 0.22 part diethyl aniline. The mixture is blended and stored as resin paste Component A. Catalyst Composition B consists of a dry mixture of 22.2 parts of plaster of Paris and 11.6 parts of a 30% benzoyl peroxide in starch blend. At the time of use the two components are mixed together and found to have a gel time of 7 minutes at 70° F. On the bolt and sleeve test the bolt broke before resin failure at over 18,000 pounds. When tested in hard igneous rock a 7/8" reinforcing bar resined for 3½ feet failed by metal fracture on a test 3 days after implacement of the bolt at a mine temperature of 68° F.

Example 29

The same resin paste as used in Example 28 is used with a catalyst consisting of 81 parts of silica mill tailings, 87 parts of Portland cement, and 18.8 parts of 30% benzoyl peroxide. The bolt on the sleeve test failed at over 16,000 pounds after 24 hours at 70° F. The 7/8" reinforcing rod resined for 4 feet into a hard limestone failed after 5 days at 70° F. before bolt failure.

Example 30

To 100 parts of the resin from Example 4 is added 11 parts of water, 1.1 parts of polyoxyethylated caster oil, 0.11 part of diethylaniline and the composition mixed until homogeneous. The catalyst system consists of 150 parts of —20 mesh sand, 21 parts of Portland cement, 10.5 parts of 30% benzoyl peroxide and 3.5 parts of dibutyl phthalate. Both compositions are storage stable and on mixing the product developes a gel time of 5 minutes at 70° F. and in the pull test both using a test bolt in pipe sleeves and a 4 foot resined length of 7/8" reinforcing rod in an overhead hole in a coal mine the metal failed before the resin released.

Example 31

The resin paste:

| | Parts |
|---|---|
| Resin from Example 4 | 100 |
| Water | 11 |
| Pyrogenic silica | 4.5 |
| Polyoxyethylated vegetable oil | 1 |

The catalyst composition:

| | |
|---|---|
| 30% benzoyl peroxide | 21 |
| Portland cement | 42 |
| Dibutyl phthalate | 7 |

On test in one week in rock, a 7/8" reinforcing rod resined for 4 feet in a 1½" hole failed by the rod breaking.

Example 32

The resin paste:

| | Parts |
|---|---|
| Resin of Example 5 | 100 |
| Calcium hydroxide | 2.8 |
| Water | 4.5 |
| Polyoxyethylated vegetable oil | 1 |
| Diethylaniline | 0.2 |

The catalyst composition:

| | |
|---|---|
| 96% benzoyl peroxide | 2.4 |
| Water | 4.7 |
| Polyoxethylated vegetable oil | 0.1 |

A mine roof supported by the above resin using 7/8" reinforcing bars penetrating 6 feet into the rock, with retaining plates held by retaining nuts on the ends of the reinforcing bars gave no indication of bonding failure or roof weakness on inspection after a period of several weeks.

Example 33

The resin paste:

| | Parts |
|---|---|
| Resin of Example 4 | 100 |
| Portland cement | 43 |
| Pyrogenic silica | 4 |
| Diethylaniline | 0.2 |

The catalyst composition:

| | |
|---|---|
| 96% benzoyl peroxide | 4.3 |
| Water | 10.3 |
| Polyoxyethylated vegetable oil | 0.1 |

The storage stable compositions in separate containers were later mixed and injected into drilled holes in rock, which holes had been washed out with water and were still wet, in a formation in a wet mine. On testing the metal of the rod failed before the bonding using a 7/8" reinforcing bar in a 4 foot hole.

Example 34

The resin paste:

| | Parts |
|---|---|
| Resin of Example 4 | 100 |
| Portland cement | 43 |
| Asbestos shorts | 10 |
| Polyoxyethylated vegetable oil | 1 |
| Diethylaniline | 0.05 |
| Resorcinol | 0.3 |

The catalyst composition:

| | |
|---|---|
| 96% benzoyl peroxide | 4.6 |
| Water | 10.7 |
| Polyoxyethylated vegetable oil | 0.1 |

In use in a wet mine the resin proved satisfactory.

*Example 35*

The resin paste:                                      Parts
    Resin of Example 6 _____ 100
    Portland cement _____ 68
    Pyrogenic silica _____ 6.4
    −20 mesh sand _____ 234
    Polyoxyethylated vegetable oil _____ 1

The catalyst composition:
    96% benzoyl peroxide _____ 6.1
    Water _____ 14.3
    Polyoxyethylated vegetable oil _____ 0.1

The catalyst paste was filled into the interior compartment of a long sausage and the resin paste filled into the outside compartment, the packages being made up of a polyester-polyethylene laminate heat sealed at the seams. On mixing in rock bolt holes by rotating a reinforcing rod at 250 r.p.m. as the rod is inserted, a good bond was obtained between the rod and the mineral formation. Using a ⅞″ rod in a 4 foot hole, resined full length, the metal of the bar broke before resin released.

*Example 36*

Composition A:                                        Parts
    Resin from Example 5 _____ 100
    Pyrogenic silica _____ 4.2
    Silica flour _____ 20
    Water _____ 11.1
    Polyoxyethylated vegetable oil _____ 0.1
    96% benzoyl peroxide _____ 6.7

Composition B:
    Resin from Example 5 _____ 97
    Portland cement _____ 41.4
    Pyrogenic silica _____ 4
    Diethylaniline _____ 0.6
    Hydroquinone _____ .02

Each of these compositions has some of the resin. One of them has all of the water, the other one has the Portland cement. The one with the water has the catalyst. The one with the Portland cement has the promoter. The compositions were stored separately and just before time of use were mixed and injected under pressure from a paint pot using a dip tube and a transfer hose to the bottom of a 1¼″ overhead hole drilled in the roof of a coal mine. Reinforcing rods were inserted therein. After 24 hours retaining plates 53 and retaining nuts 54 were attached and drawn up. The same pattern of bolting is used as has been previously used with rock bolts. No evidence of mine roof failure appeared on inspection at daily intervals of a period of weeks.

*Example 37*

The resin paste:                                      Parts
    Resin from Example 4 _____ 100
    Water _____ 11
    Pyrogenic silica _____ 1
    Polyoxyethylated vegetable oil _____ 1
    Diethylaniline _____ 0.1

The catalyst composition:
    +20 mesh −10 mesh sand _____ 147
    30% benzoyl peroxide _____ 11.7
    Portland cement _____ 23.3
    Bentonite clay _____ 3

The compositions are storage stable and on mixing and injection into downward holes for a suspension bridge foundation gave strong bonding from the rock to the reinforcing rod.

I claim:

1. A two-component, storage-stable, mine temperature curing, thermosetting resin composition which after compounding and before mixing can be kept at room temperatures up to at least 80° F. for at least three months in at least two separate parts, and which cures rapidly when catalyzed by mixing the separate parts which comprises: (A) in one compartment for storage a first component comprising an intimate mixture of (1) an essentially linear polymerizable unsaturated polyester prepared by reacting an alpha-beta ethylenically unsaturated polycarboxylic acid and an aliphatic polyol in the proportion of 10% to 90% by weight of the sum of (1) and (2); (2) a monomeric cross-linking agent for said (1) containing a $CH_2=CH<$ group in the proportion of 90% to 10% by weight of the sum of (1) and (2); (3) an inhibiting amount of a phenolic polymerization inhibitor; and (4) a promoter for a peroxide catalyst; and (B) in a separate compartment for storage, a second component comprising (5) a cross-linking peroxide catalyst system; and mixed with the components in one of A and B; (6) about 5% to about 10% of the final composition of a water-reactive filler, and with the components in the other of A and B; (7) water in at least a quantity sufficient to react with at least a substantial portion of the water-reactive filler and also minimize shrinkage; and in at least one of said compartments A and B (8) a thickener to make the mixed unset resin thixotropic; whereby when the catalyst and resin systems in compartments A and B are mixed, a quick-setting thixotropic mixture is obtained which at ambient temperatures of 40° F. to 90° F. has such thickness that it does not flow out of a 1½″ hole from its own weight and whose viscosity drops on stirring with sufficient rapidity that the mixture (a) may be pumped, (b) may be transferred into and pumped out of a plastic tube, (c) will flow into rock strata, (d) will receive a concrete reinforcing bar under hand pressure in a drilled hole, and (e) has a viscosity of between about 12,000 and 150,000 centipoises at slow stirring speeds; and on standing in a bore hole at ambient mine temperatures of 40° F. to 90° F. hardens to a high strength mass in one-half to forty-eight hours while retaining substantially its original volume.

2. A two-component, storage-stable, mine temperature curing, thermosetting resin composition which after compounding and before mixing can be kept at room temperatures up to at least 80° F. for at least three months in at least two separate parts, and which cures rapidly when catalyzed by mixing the separate parts which comprises: (A) in one compartment for storage a first component comprising an intimate mixture of (1) an essentially linear polymerizable unsaturated polyester prepared by reacting an alpha-beta ethylenically unsaturated polycarboxylic acid and an aliphatic polyol in the proportion of 10% to 90% by weight of the sum of (1) and (2); (2) a monomeric cross-linking agent for said (1) containing a $CH_2=CH<$ group in the proportion of 90% to 10% by weight of the sum of (1) and (2); (3) an exhibiting amount of a phenolic polymerization inhibitor; and (4) a promoter for a peroxide catalyst; and (B) in a separate compartment for storage, a second component comprising (5) a cross-linking peroxide catalyst system; and mixed with the components in one of A and B; (6) about 5% to about 10% of the final composition of a water-reactive filler selected from the group consisting of Portland cement, and plaster of Paris, and with the components in the other of A and B; (7) water in at least a quantity sufficient to react with at least a substantial portion of the water-reactive filler and also minimize shrinkage; and in at least one of said compartments A and B (8) a thickener selected from the group consisting of pyrogenic silica, silica aerogel, asbestos, aluminum stearate, calcium silicate, finely-divided calcium carbonate, clays coated with amines, clays coated with long-chain fatty acids and clays coated with cationic surfactants; whereby when the catalyst and resin systems in compartments A and B are mixed, a quick-setting thixotropic mixture is obtained which at ambient temperatures of 40° F. to 90° F. has such thickness that it does not flow out of a 1½″ hole from its own weight and whose viscosity drops on stirring with sufficient rapidity that the mixture (a) may be pumped, (b) may be transferred into and pumped out of a plastic tube, (c) will flow into rock strata, (d) will receive a concrete reinforcing bar under hand pressure in a drilled hole, and (e) has a viscosity of between about 12,000 and 150,000 centipoises at slow stirring speeds; and on standing in a bore hole at ambient mine temperatures of 40° F. to 90°% F. hardens to a high strength mass in one-half to forty-eight hours while retaining substantially its original volume.

3. A two-component, storage-stable, mine temperature curing, thermosetting resin composition which after compounding and before mixing can be kept at room temperature up to at least 80° F. for at least three months in at least two separate parts, and which cures rapidly when catalyzed by mixing the separate parts which comprises: (A) in one compartment for storage a first component comprising an intimate mixture of (1) an essentially linear polymerizable unsaturated polyester prepared by reacting an alpha-beta ethylenically unsaturated polycarboxylic acid and an aliphatic polyol in the proportion of 10% to 90% by weight of the sum of (1) and (2); (2) a momeric cross-linking agent for said (1) containing a $CH_2=CH<$ group in the proportion of 90% to 10% by weight of the sum of (1) and (2); (3) an inhibiting amount of a phenolic polymerization inhibitor; and (4) a promoter for an organic peroxide catalyst; and (B) in a separate compartment for storage, a second component comprising (5) a cross-linking organic peroxide catalyst system; and mixed with components in A; (6) about 5% to about 10% of the final composition of Portland cement as a water-reactive filler, and with the components in B; (7) water in at least a quantity sufficient to react with at least a substantial portion of the Portland cement in A (8) a finely-divided silica; whereby when the catalyst and resin systems in compartments A and B are mixed, a quick-setting thixotropic mixture is obtained which at ambient temperature sof 40° F. to 90° F. has such thickness that it does not flow out of a 1½" hole from its own weight and whose viscosity drops on stirring with sufficient rapidity that the mixture (a) may be pumped, (b) may be transferred into and pumped out of a plastice tube, (c) will flow into rock strata, (d) will receive a concrete reinforcing bar under hand pressure in a drilled hole, and (e) has a viscosity of between about 12,000 and 150,000 centipoises at slow stirring speeds; and on standing in a bore hole at ambient mine temperatures of 40° F. to 90° F. hardens to a high strength mass in one-half to forty-eight hours while retaining substantially its original volume.

4. A dual-compartment resin package comprising: an outer sealed flexible envelope having a plurality of sealed edges and containing also an inner sealed flexible envelope thus forming two separate compartments for storage, one of said compartments having therein the composition set forth as Component A of claim 1, and in the other compartment the composition set forth as Component B of claim 1.

5. A long narrow sealed flexible outer envelope containing the composition as set forth in compartment (A) of claim 2, and also an inner sealed flexible envelope containing a composition as set forth in compartment (B) of claim 2.

6. A long narrow sealed flexible outer envelope containing the composition as set forth in compartment (A) of claim 3, and also an inner sealed flexible envelope containing a composition as set forth in compartment (B) of claim 3.

7. A method of reinforcing a rock formation comprising: forming a relatively long narrow hole in said rock formation; forming a mixture of (1) an essentially linear polymerizable unsaturated polyester prepared by reacting an alpha-beta ethylenically unsaturated polycarboxylic acid and an aliphatic polyol; (2) a monomeric cross-linking agent for said (1) containing a $CH_2=CH<$ group; (3) an inhibiting amount of a phenolic polymerization inhibitor; and (4) a promoter for a peroxide catalyst; (5) a cross-linking peroxide catalyst system; (6) a water-reactive filler; (7) water in at least a quantity sufficient to react with at least a substantial portion of the water-reactive filler and also minimize shrinkage; (8) a thickener to impart thixotropic characteristics to the mixed unset resin whereby the said filler components are kept suspended, said mixture being thixotropic and from temperatures of 40° F. to 90° F. having such thickness that it does not flow out of a 1½" hole from its own weight but whose viscosity drops on stirring with sufficient rapidity that the mixture (a) may be pumped, (b) may be transferred into and pumped out of a plastic tube, and (c) will flow into rock strata; inserting the open end of a transfer tube beneath the surface of the mixed resin, withdrawing air from within the transfer tube, thus causing the resin mixture to flow into the transfer tube; inserting the transfer tube into the hole in the rock until adjacent to the far end of the hole, inserting a piston through the transfer tube to force the resin mixture out of the tube and into the hole in the rock while simultaneously withdrawing the transfer tube from the hole at such a rate that the discarged resin substantially fills the cross section of said hole, removing the transfer tube and inserting a reinforcing member into the thixotropic resin composition in the hole, whereby the peripheral space between the reinforcing member and the rock is substantially filled with resin, and permitting the resin to harden, thus reinforcing the rock.

8. A method of reinforcing a rock formation comprising: forming a relatively long narrow hole in said rock formation; forming a mixture of (1) an essentially linear polymerizable unsaturated polyester prepared by reacting an alpha-beta ethylenically unsaturated polycarboxylic acid and an aliphatic polyol; (2) a monomeric cross-linking agent for said (1) containing a $CH_2=CH<$ group; (3) an inhibiting amount of a phenolic polymerization inhibitor; and (4) a promoter for a peroxide catalyst; (5) a cross-linking peroxide catalyst system; (6) a water-reactive filler selected from the group consisting of Portland cement and plaster of Paris; (7) water in at least a quantity sufficient to react with at least a substantial portion of the water-reactive filler and also minimize shrinkage; (8) a thickener selected from the group consisting of pyrogenic silica, silica aerogel, asbestos, aluminum stearate, calcium silicate, finely-divided calcium carbonate, clays coated with amines, clays coated with long-chain fatty acids and clays coated with cationic surfactants to impart thixotropic characteristics to the mixed unset resin, whereby the said filler components are kept suspended, said mixture being thixotropic and from temperatures of 40° F. to 90° F. having such thickness that it does not flow out of a 1½" hole from its own weight but whose viscosity drops on stirring with sufficient rapidity that the mixture (a) may be pumped, (b) may be transferred into and pumped out of a plastic tube, and (c) will flow into rock strata; inserting the open end of a transfer tube beneath the surface of the mixed resin, withdrawing air from within the transfer tube, thus causing the resin mixture to flow into the transfer tube; inserting the transfer tube into the hole in the rock until adjacent to the far end of the hole, inserting a piston through the transfer tube to force the resin mixture out of the tube and into the hole in the rock while simultaneously withdrawing the transfer tube from the hole at such a rate that the discharged resin substantially fills the cross section of said hole, removing the transfer tube and inserting a reinforcing member into the thixotropic resin composition in the hole, whereby the peripheral space between the reinforcing member and the rock is substantially filled with resin, and permitting the resin to harden, thus reinforcing the rock.

9. A method of reinforcing a rock formation comprising: forming a relatively long narrow hole in said rock formation; forming a mixture of (1) an essentially linear polymerizable unsaturated polyester prepared by reacting an alpha-beta ethylenically unsaturated polycarboxylic acid and an aliphatic polyol; (2) a monomeric cross-linking agent for said (1) containing a $CH_2{=}CH{<}$ group; (3) an inhibiting amount of a phenoilc polymerization inhibitor; and (4) a promoter for an organic peroxide catalyst; (5) a cross-linking organic peroxide catalyst system; (6) Portland cement; (7) water in at least a quantity sufficient to react with at least a substantial portion of the Portland cement and also minimize shrinkage; (8) a finely-divided silica to impart thixotropic characteristics to the mixed unset resin where the Portland cement is kept suspended, said mixture being thixotropic and from temperatures of 40° F. to 90° F. having such thickness that it does not flow out of a 1½″ hole from its own weight but whose viscosity drops on stirring with sufficient rapidity that the mixture (a) may be pumped, (b) may be transferred into and pumped out of a plastic tube, and (c) will flow into rock strata; inserting the open end of a transfer tube beneath the surface of the mixed resin, withdrawing air from within the transfer tube, thus causing the resin mixture to flow into the transfer tube; inserting the transfer tube into the hole in the rock until adjacent to the far end of the hole, inserting a piston through the transfer tube to force the resin mixture out of the tube and into the hole in the rock while simultaneously withdrawing the transfer tube from the hole at such a rate that the discharged resin substantially fills the cross section of said hole, removing the transfer tube and inserting a reinforcing member into the thixotropic resin composition in the hole, whereby the peripheral space between the reinforcing member and the rock is substantially filled with resin, and permitting the resin to harden, thus reinforcing the rock.

10. The dual-compartment package of claim 4 in which the envelopes are formed of a styrene impermeable laminate of a polyester film and a film selected from the group consisting of polyvinylalcohol film, polyethylene film and polypropylene film.

11. A method of reinforcing an exposed face of rock which comprises: forming a comparatively long small hole therein, inserting in said hole at least one package as set forth in claim 4, inserting a reinforcing member and agitating said reinforcing member as it is inserted, thus rupturing the outer and inner envelopes and intermixing the contents as the reinforcing member in inserted into said long narrow hole, thus filling at least a substantial portion of the peripheral space between the inserted member and the walls of said hole, discontinuing said agitation, then causing the admixed resin components to react, thereby firmly embedding said reinforcing member in said hole, thus reinforcing the rock formation.

12. A method of reinforcing an exposed face of rock which comprises: forming a comparatively long small hole therein, inserting in said hole at least one package as set forth in claim 5, inserting a reinforcing member and agitating said reinforcing member as it is inserted, thus rupturing the outer and inner envelopes and intermixing the contents as the reinforcing member is inserted into said long narrow hole, thus filling at least a substantial portion of the peripheral space between the inserted member and the walls of said hole, discontinuing said agitation, then causing the admixed resin components to react, thereby firmly embedding said reinforcing member in said hole, thus reinforcing the rock formation.

13. A method of reinforcing an exposed face of rock which comprises: forming a comparatively long small hole therein, inserting in said hole at least one package as set forth in claim 6, inserting a reinforcing member and agitating said reinforcing member as it is inserted, thus rupturing the outer and inner envelopes and intermixing the contents as the reinforcing member is inserted into said long narrow hole, thus filling at least a substantial portion of the peripheral space between the inserted member and the walls of said hole, discontinuing said agitation, then causing the admixed resin components to react, thereby embedding said reinforcing member in said hole, thus reinforcing the rock formation.

References Cited

UNITED STATES PATENTS

| | | | |
|---|---|---|---|
| 333,250 | 12/1885 | Pell | 222—386 X |
| 1,238,403 | 8/1917 | Hellein | 222—386 X |
| 2,288,321 | 6/1942 | Nordlander et al. | 260—40 |
| 2,609,353 | 9/1952 | Rubens et al. | |
| 2,804,438 | 8/1957 | Biefeld et al. | |
| 2,887,461 | 5/1959 | Hort | 260—40 |
| 2,898,259 | 8/1959 | Wheelock. | |
| 2,930,199 | 3/1960 | Jarund | 61—45 |
| 3,010,933 | 11/1961 | Lyon. | |
| 3,087,606 | 4/1963 | Bollmeier et al. | 206—47 |
| 3,108,404 | 10/1963 | Lamb | 61—45 X |
| 3,108,443 | 10/1963 | Schuermann et al. | 61—45 |
| 3,132,195 | 5/1964 | Milligan | 260—40 |
| 3,240,736 | 3/1966 | Beckwith | 260—40 |

FOREIGN PATENTS

| | | |
|---|---|---|
| 224,588 | 11/1962 | Austria. |
| 918,086 | 9/1954 | Germany. |
| 1,126,823 | 4/1962 | Germany. |
| 928,439 | 6/1963 | Great Britain. |

DAVID J. WILLIAMOWSKY, *Primary Examiner.*

JACOB SHAPIRO, *Examiner.*